United States Patent
Gambeski et al.

(10) Patent No.: US 9,018,858 B2
(45) Date of Patent: Apr. 28, 2015

(54) CALIBRATION METHOD FOR LED LIGHTING SYSTEMS

(75) Inventors: Gannon T. Gambeski, Saint James, NY (US); David P. Eckel, Fort Salonga, NY (US); Seckin K. Secilmis, Seaford, NY (US); Andrew B. Walsh, East Islip, NY (US); Richard Waring, Jr., West Sayville, NY (US); Rand Lee, Kirkland, WA (US); David Jenkins, Kirkland, WA (US); Maciej Adam Jakuc, Kirkland, WA (US); Jeffrey Reeder, Kirkland, WA (US)

(73) Assignee: B/E Aerospace, Inc., Wellington, FL (US)

( * ) Notice: Subject to any disclaimer, the term of this patent is extended or adjusted under 35 U.S.C. 154(b) by 868 days.

(21) Appl. No.: 13/035,329

(22) Filed: Feb. 25, 2011

(65) Prior Publication Data

US 2012/0019164 A1    Jan. 26, 2012

Related U.S. Application Data

(63) Continuation-in-part of application No. 12/566,146, filed on Sep. 24, 2009, now Pat. No. 8,378,595.

(60) Provisional application No. 61/099,713, filed on Sep. 24, 2008, provisional application No. 61/105,506,
(Continued)

(51) Int. Cl.
*G05F 1/00*   (2006.01)
*B64D 47/02*  (2006.01)
(Continued)

(52) U.S. Cl.
CPC ......... *B64D 47/02* (2013.01); *B64C 2027/8236* (2013.01); *B64D 2011/0038* (2013.01); *H05B 37/0254* (2013.01)

(58) Field of Classification Search
USPC ............. 315/185 R, 192, 291, 294, 297, 299, 315/300, 301, 302, 307, 308, 312
See application file for complete search history.

(56) References Cited

U.S. PATENT DOCUMENTS

| 4,729,742 A | 3/1988 | Onishi et al. |
| 5,003,432 A | 3/1991 | Mandy |

(Continued)

FOREIGN PATENT DOCUMENTS

| EP | 1901587 A2 | 3/2008 |
| JP | 2003-524284 A | 8/2003 |

(Continued)

OTHER PUBLICATIONS

Supplemental Search Report issued in related application EP09816872.7, dated Aug. 22, 2012, 6 pages.
(Continued)

*Primary Examiner* — Douglas W Owens
*Assistant Examiner* — Jianzi Chen
(74) *Attorney, Agent, or Firm* — Drinker Biddle & Reath LLP

(57) ABSTRACT

A method of operating a lighting fixture comprising a plurality of discrete illumination sources of distinguishably different color coordinates comprises determining target color coordinates and luminous flux at which to operate the lighting fixture, determining input electrical power values for each of the plurality of discrete illumination sources that substantially produce the target color coordinates and luminous flux by referencing a calibration data lookup table having calibration data based on measurements of the plurality of discrete illumination sources, determining a color mixing zone defined by three distinguishably different color coordinates of the plurality of discrete illumination sources within which the target color coordinates lie according to the calibration data, determining luminous flux ratios for each of the plurality of discrete illumination sources having one of the three distinguishably different color coordinates defining the color mixing zone that substantially produces the target color coordinates, and determining input electrical power levels for each of the plurality of discrete illumination sources that generate the determined luminous flux ratios.

6 Claims, 16 Drawing Sheets

Related U.S. Application Data filed on Oct. 15, 2008, provisional application No. 61/308,171, filed on Feb. 25, 2010, provisional application No. 61/320,545, filed on Apr. 2, 2010, provisional application No. 61/345,378, filed on May 17, 2010.

(51) Int. Cl.
*H05B 37/02* (2006.01)
*B64C 27/82* (2006.01)
*B64D 11/00* (2006.01)

(56) References Cited

U.S. PATENT DOCUMENTS

| | | |
|---|---|---|
| 5,490,048 A | 2/1996 | Brassier et al. |
| 5,677,603 A | 10/1997 | Speirs et al. |
| 6,016,038 A | 1/2000 | Mueller et al. |
| 6,211,626 B1 | 4/2001 | Lys et al. |
| 6,220,721 B1 | 4/2001 | Chan et al. |
| 6,552,495 B1 | 4/2003 | Chang |
| 6,815,842 B2 | 11/2004 | Fehd et al. |
| 6,967,447 B2 | 11/2005 | Lim et al. |
| 7,114,827 B2 | 10/2006 | Halter |
| 7,161,556 B2 | 1/2007 | Morgan et al. |
| 7,173,383 B2 | 2/2007 | Vornsand et al. |
| 7,198,387 B1 | 4/2007 | Gloisten et al. |
| 7,266,315 B2 | 9/2007 | Sato |
| 7,494,255 B2 | 2/2009 | Bryan et al. |
| 7,658,506 B2 | 2/2010 | Dowling |
| 7,717,593 B2 | 5/2010 | Clark |
| 7,717,594 B2 | 5/2010 | Clark |
| 7,969,404 B2 | 6/2011 | Lee et al. |
| 8,013,533 B2 | 9/2011 | De Rijck et al. |
| 8,708,560 B2 | 4/2014 | Kraemer |
| 2003/0208764 A1 | 11/2003 | Galipeau et al. |
| 2004/0183480 A1 | 9/2004 | Halter |
| 2004/0240211 A1 | 12/2004 | Rodgers et al. |
| 2005/0174309 A1 | 8/2005 | Bouwens et al. |
| 2005/0202785 A1 | 9/2005 | Meyer |
| 2005/0275912 A1 | 12/2005 | Chen et al. |
| 2006/0187081 A1 | 8/2006 | Gloisten et al. |
| 2007/0034775 A1 | 2/2007 | Cheng et al. |
| 2007/0058377 A1 | 3/2007 | Zampini, II et al. |
| 2007/0097675 A1 | 5/2007 | Koren et al. |
| 2007/0103646 A1 | 5/2007 | Young |
| 2007/0139941 A1 | 6/2007 | Bryan et al. |
| 2007/0188427 A1 | 8/2007 | Lys et al. |
| 2007/0200725 A1 | 8/2007 | Fredericks et al. |
| 2007/0274084 A1 | 11/2007 | Kan et al. |
| 2007/0285921 A1 | 12/2007 | Zulim et al. |
| 2007/0291483 A1 | 12/2007 | Lys |
| 2008/0089071 A1 | 4/2008 | Wang |
| 2008/0136334 A1 | 6/2008 | Robinson et al. |
| 2008/0215279 A1 | 9/2008 | Salsbury et al. |
| 2008/0266887 A1 | 10/2008 | Wentland et al. |
| 2009/0001251 A1 | 1/2009 | Ng et al. |
| 2009/0021955 A1 | 1/2009 | Kuang et al. |
| 2009/0059610 A1 | 3/2009 | Marshall et al. |
| 2009/0086472 A1 | 4/2009 | Kinnune |
| 2009/0140630 A1 | 6/2009 | Kijima et al. |
| 2009/0251898 A1 | 10/2009 | Kinnune et al. |
| 2010/0007588 A1 | 1/2010 | Zygmunt et al. |
| 2011/0096099 A1 | 4/2011 | Yamamoto et al. |

FOREIGN PATENT DOCUMENTS

| | | |
|---|---|---|
| JP | 2004-006253 A | 1/2004 |
| JP | 2004-158370 A | 6/2004 |
| JP | 2005513724 A | 5/2005 |
| JP | 2005-517278 A | 6/2005 |
| JP | 2005191004 A | 7/2005 |
| JP | 2007-109584 A | 4/2007 |
| JP | 2007123279 A | 5/2007 |
| JP | 2007-249647 A | 9/2007 |
| JP | 2008-109514 A | 5/2008 |
| JP | 2008-135224 A | 6/2008 |
| JP | 2008210588 A | 9/2008 |
| JP | 2009503778 A | 1/2009 |
| JP | 2010033806 A | 2/2010 |
| JP | 20100509765 A | 3/2010 |
| WO | 03/067934 A2 | 8/2003 |
| WO | 2007/013003 A1 | 2/2007 |
| WO | WO 2008/047335 A1 | 4/2008 |
| WO | 2008/051464 A1 | 5/2008 |
| WO | 2009/034060 A1 | 3/2009 |
| WO | WO 2009/035493 A1 | 5/2009 |
| WO | 2010/004871 A1 | 1/2010 |

OTHER PUBLICATIONS

Office Action issued in related application JP2011-528100 with English translation, dated Jan. 10, 2013, 7 pages.
Office Action issued in related application EP09816872, Jun. 18, 2013, 5 pages.
Office Action issued in related application JP2012-555185, Sep. 11, 2013, 7 pages.
Office Action issued in related application JP2012-555178, Sep. 11, 2013, 4 pages.
Hoelen, C., et al, "Color tunable LED spot lighting", Proceedings of the Sixth International Conference on Solid State Lighting (SPIE), Sep. 12, 2006, vol. 6337, pp. 63770Q-1-63770Q-15.
Supplementary European Search Report and Written Opinion issued in related application EP11748155, Feb. 18, 2014, 8 pages.
Supplementary European Search Report and Written Opinion issued in related application EP11748130, Feb. 20, 2014, 9 pages.
Supplementary European Search Report and Written Opinion issued in related application EP11748178, Mar. 4, 2014, 10 pages.

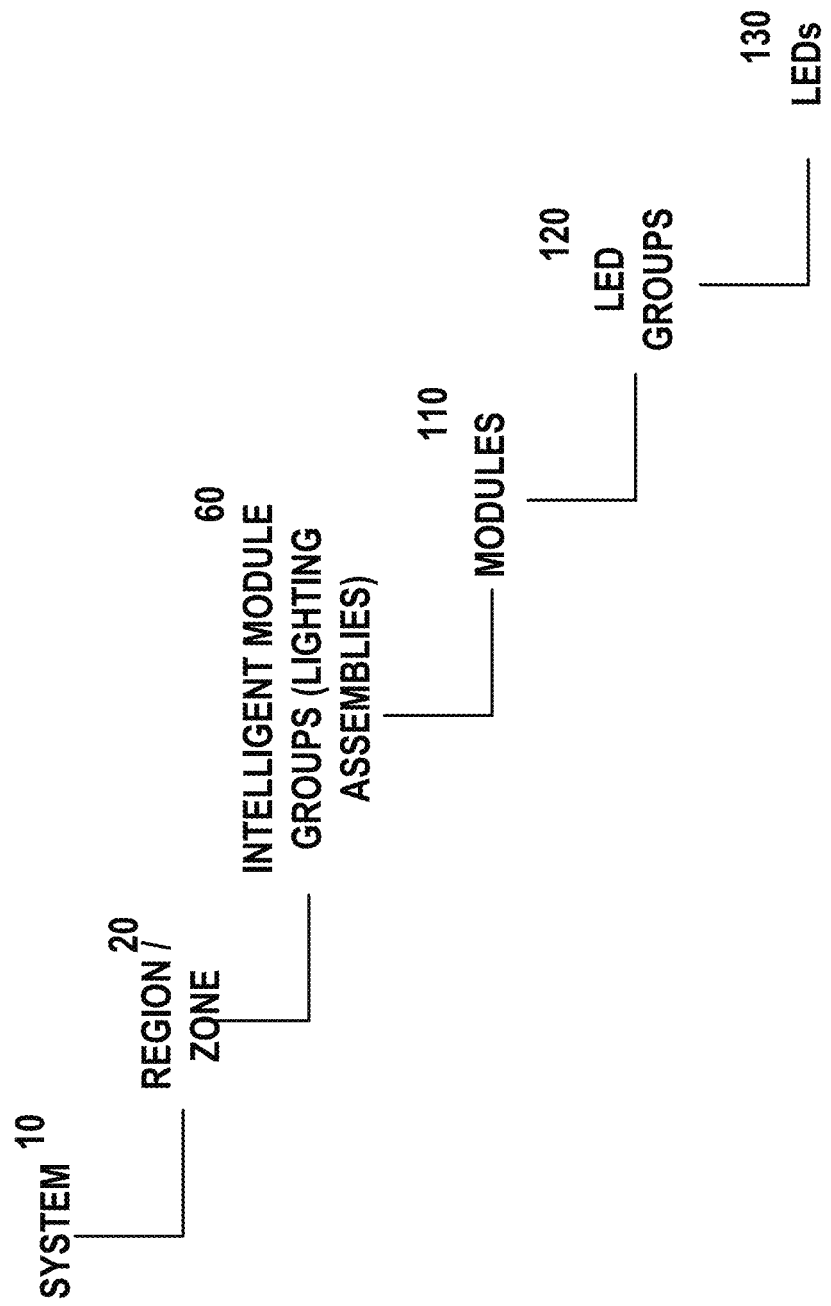

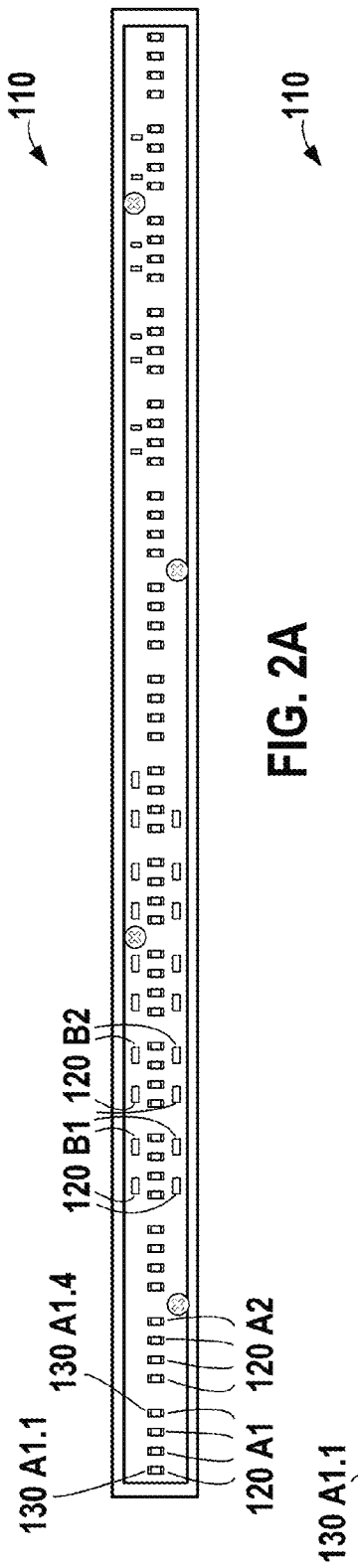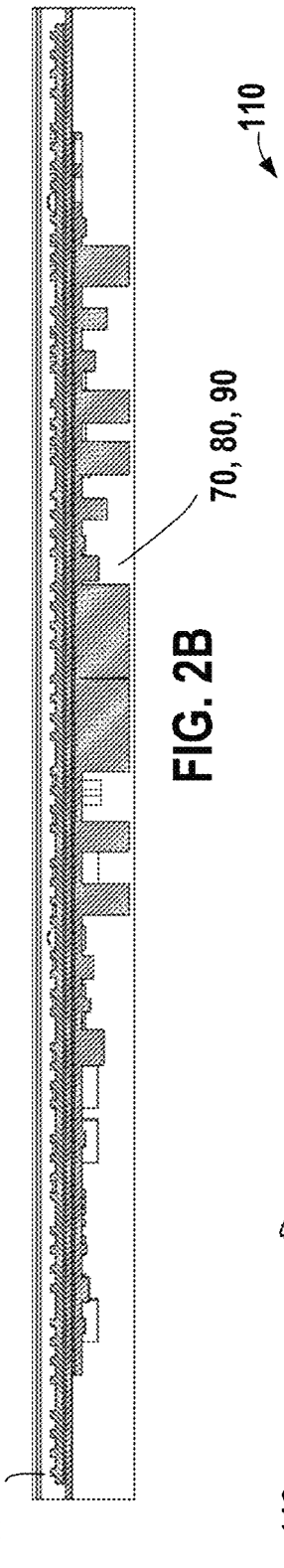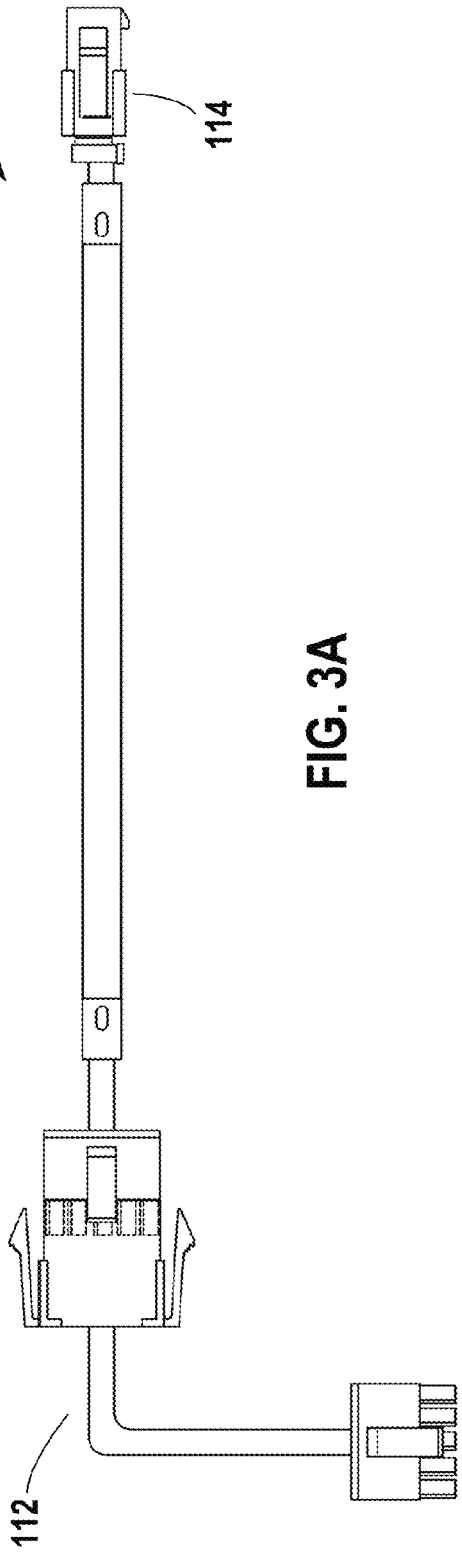
FIG. 2A
FIG. 2B
FIG. 3A

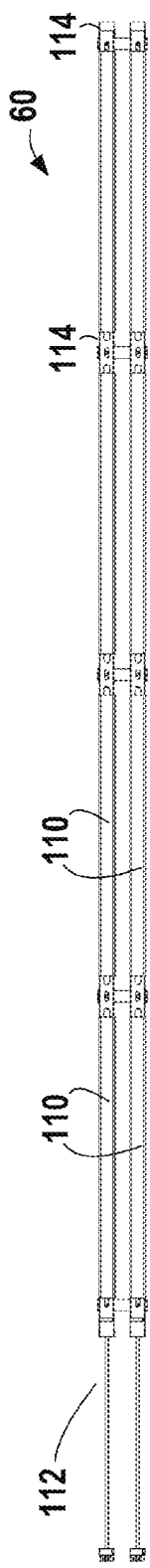
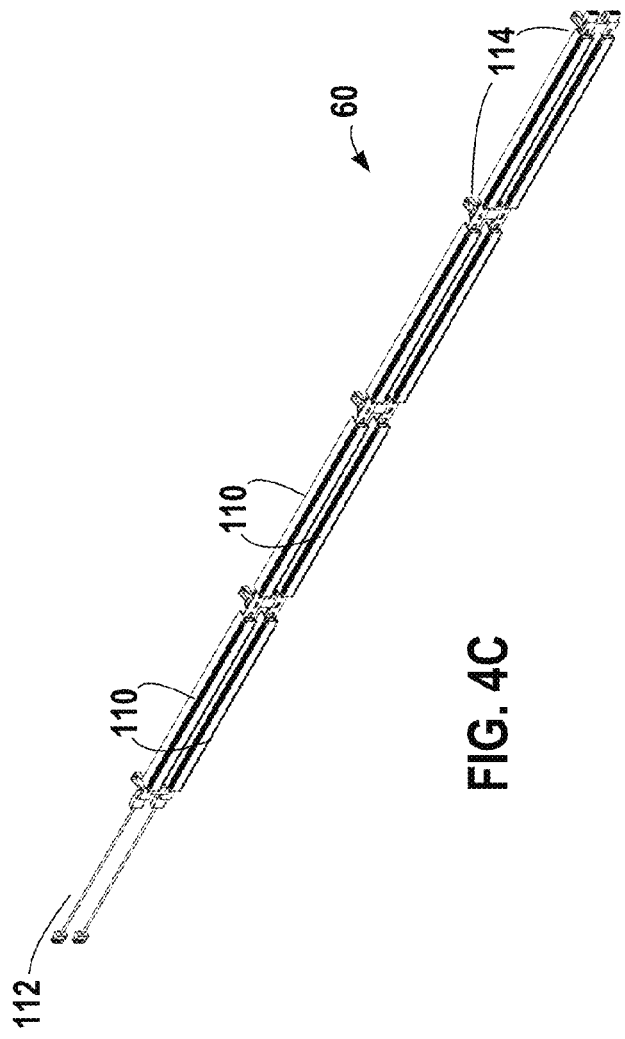
FIG. 4A
FIG. 4B
FIG. 4C

CALIBRATION METHOD FOR LED LIGHTING SYSTEMS

CROSS REFERENCE TO RELATED APPLICATIONS

The present application is a continuation-in-part of U.S. patent application Ser. No. 12/566,146, filed on Sep. 24, 2009, which claims the priority benefit of U.S. Provisional Application No. 61/099,713, filed Sep. 24, 2008, entitled, "An Aircraft LED Washlight System and Method for Controlling Same" and U.S. Provisional Application No. 61/105,506, filed Oct. 15, 2008, entitled, "An Aircraft LED Washlight System and Method for Controlling Same." The present application claims the priority benefit of the above-referenced applications, and also claims the priority benefit of U.S. Provisional Application No. 61/308,171, filed Feb. 25, 2010, entitled "Lighting System for Vehicle Cabin," U.S. Provisional Application No. 61/320,545, filed Apr. 2, 2010, entitled "Lighting System for Vehicle Cabin," and U.S. Provisional Application No. 61/345,378, filed May 17, 2010, entitled "Lighting System for Vehicle Cabin." All of the above-referenced applications are herein incorporated by reference in their entirety.

BACKGROUND

Washlights are used to provide lighting accents generally via indirect lighting (i.e., an area is illuminated primarily by light from the illumination source that is reflected off of another surface). For vehicles in general, and specifically here for aircraft, washlights can be used to create various moods, particularly when colored lighting is used.

Advances in light emitting diode (LED) technology has made them an ideal source of light where low-powered lighting solutions are desirable, which is particularly true in aircraft in which power availability is limited. However, with known systems, a degree of sophistication is lacking with regard to the full range of control that is possible with the use of LEDs and light sources having similar properties.

One problem introduced by the use of LED lighting technology is the light output by different LEDs of the same type and model can vary in intensity given the same input electrical signal. Variances in brand new LEDs are due to variances in manufacturing processes. The output of the LEDs can also vary over operating temperature and with the length of time that the LEDs have been in service (i.e., their age). Thus, a washlight installation that includes multiple LED lighting modules may not have uniform lighting characteristics (e.g., color, color temperature, and brightness) if all the LEDs of each type in the LED lighting modules operate using the same input electrical signal. Likewise, a new LED lighting module that replaces one out of many older LED lighting modules in a washlight installation may also not have lighting characteristics that match the older LED lighting module which is replaced when operating using the same input electrical signal.

SUMMARY

A method of calibrating a lighting fixture comprising a plurality of discrete illumination sources of distinguishably different color coordinates comprises measuring color coordinates of each of the plurality of discrete illumination sources, determining a color mixing zone defined by three distinguishably different color coordinates of the plurality of discrete illumination sources within which a target color coordinates lie, determining luminous flux ratios for each of the plurality of discrete illumination sources having one of the three distinguishably different color coordinates defining the color mixing zone that substantially produces the target color coordinates, and determining input electrical power levels for each of the plurality of discrete illumination sources that generate the determined luminous flux ratios.

A method of operating a lighting fixture comprising a plurality of discrete illumination sources of distinguishably different color coordinates comprises determining target color coordinates and luminous flux at which to operate the lighting fixture, determining input electrical power values for each of the plurality of discrete illumination sources that substantially produce the target color coordinates and luminous flux by referencing a calibration data lookup table having calibration data based on measurements of the plurality of discrete illumination sources, determining a color mixing zone defined by three distinguishably different color coordinates of the plurality of discrete illumination sources within which the target color coordinates lie according to the calibration data, determining luminous flux ratios for each of the plurality of discrete illumination sources having one of the three distinguishably different color coordinates defining the color mixing zone that substantially produces the target color coordinates, and determining input electrical power levels for each of the plurality of discrete illumination sources that generate the determined luminous flux ratios.

BRIEF DESCRIPTION OF THE DRAWINGS

The invention is described below with reference to the drawings that illustrate various embodiments of the invention.

FIG. 1C is a hierarchical tree diagram illustrating the different levels of lighting;

FIG. 2A is a bottom view of an exemplary lighting module;

FIG. 2B is a side cross-sectional view of the lighting module shown in FIG. 2A;

FIG. 3A is a pictorial view of an exemplary lighting module showing its plug assemblies;

FIGS. 4A-C are respective side, top, and perspective views of an exemplary lighting module group connected in a U-shaped manner;

DETAILED DESCRIPTION OF THE PREFERRED EMBODIMENTS

Overview and Structural Hierarchy

Figures 1A, 1B:
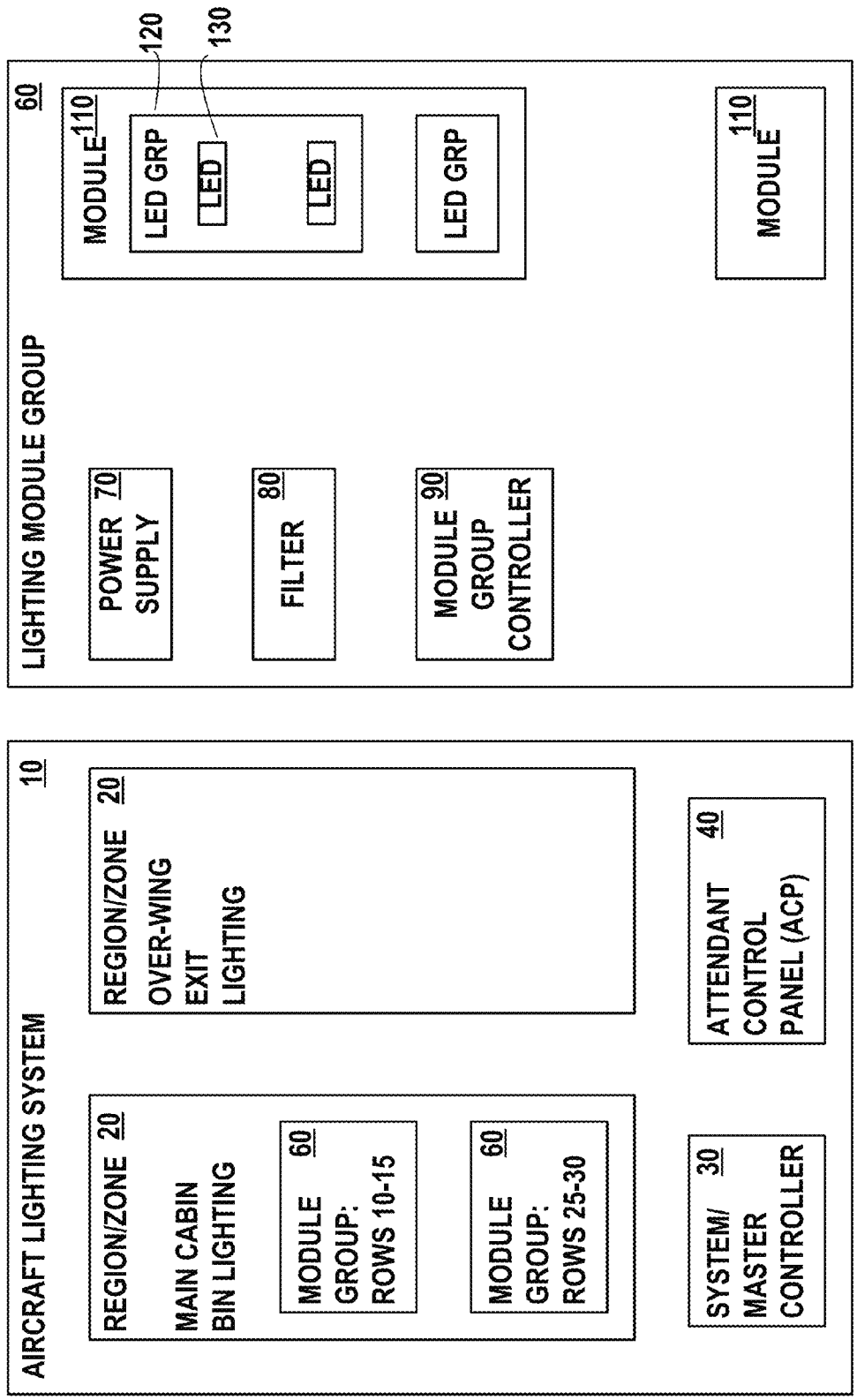
FIG. 1A is a block diagram illustrating an exemplary configuration of lighting system components.
FIG. 1B is a block diagram illustrating the primary components of a lighting module group.

A modular lighting system is provided in which the modules or module groups contain an intelligent control. FIG. 1A provides an exemplar organization of a grouping hierarchy that may be used in the aircraft lighting system 10. The lighting system may be broken down into different addressable lighting regions 20 that could be used on an aircraft. For example, the regions on an aircraft could include: sidewall lighting, cross-bin lighting, over wing exit lighting, ceiling lighting, direct lighting, etc. The regional breakdown of the lighting system allows lighting control over broad areas of the aircraft.

Within each of these regions 20, one or more lighting module groups 60 may be provided. These module groups 60 may be fashioned as line replaceable units (LRUs) to enable quick assembly, maintenance, and replacement. For example, one module group 60 could be for the main cabin cross-bin lighting for rows 10-15.

The aircraft lighting system 10 further comprises a system controller 30 that can use, e.g., an attendant control panel (ACP) 40 as the primary user interface for attendants controlling the lighting during a flight (including on-ground parts of a flight), as well as for maintenance.

The LED modules in the system are designed to be interconnected with one another into module groups. The attached Appendix provides illustrations of the bracketing and cabling that may be used in order to connect the modules together and to the existing aircraft structure for mounting.

The lighting module groups 60 each comprise a power supply 70 that converts the aircraft power into a power usable by the module group 80, and may comprise a filter 80 for filtering out harmful noise and other signals. Each module group comprises a module group controller 90 that can intelligently handle high-level instructions from the system controller 30 and possibly provide useful information back to the system controller 30.

The lighting module group 60 may comprise one or more lighting modules 110 that each, in turn, comprise a plurality of LEDs 130 that may be organized in LED groups 120. Note that an individual LED 130 could belong to more than one group 120. For example, an LED 130 could be arranged according to one group based on the manufacturer, and could be arranged in another group based on its color.

Note that when the lighting module group 60 comprises a single lighting module 110, the characteristics (such as power supply 70, filter 80, and controller 90) can be associated with the module 110 itself. In other words, the lighting module group 60 and lighting module 110 could be construed as the same thing when there is only a single module 110 in the group 60.

Each module 110 can be designed to comprise one or more of the following: a) control circuitry 90 for controlling the module and possibly other attached slave modules 110' in a group 60; b) power supply circuitry 70 to enable an LED washlight to function off of, e.g., a 115 VAC, 400 HZ power source. The power supply 70 can, e.g., receive 115 VAC, 400 Hz in and convert it to 28 VDC, 12 VDC, 5 VDC, or whatever DC voltage is typically necessary for LEDs and electronics to operate. The power supply 70 design is preferably a switching power supply, but could also be a linear or other topology with approximately a 75%-85% efficiency and receive approximately 7.5 W in and provide 5.7 W out to the LED, microcontroller and other electronics load; and c:) filtering circuitry 80 to filter incoming power to the modules and ensure that no problematic harmonic emissions, spikes or other undesirable power conditions are introduced back onto the aircraft power bus.

The LEDs 130 within a module can possibly be controlled individually, within specific groupings of LEDs 120 within a module, or collectively (all LEDs in a module). The groupings 120 can comprise arbitrary numbers of LEDs, or can be grouped according to area zones, color, LED characteristics, or other schemes.

Figure 1D:
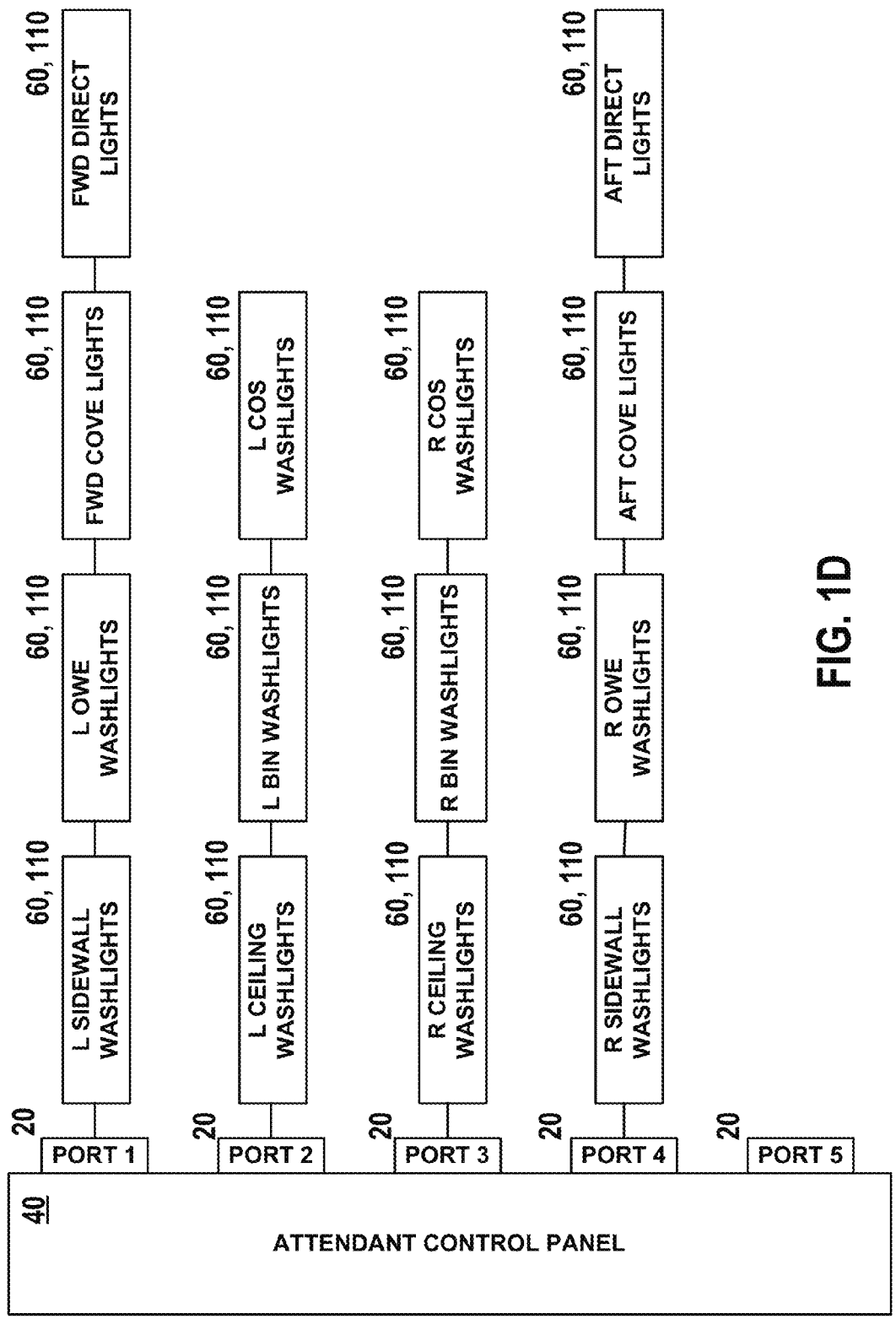
FIG. 1D is a block diagram illustrating regional groupings of modules.

FIG. 1C shows the overall hierarchical structure in an exemplary design, although it should be noted that various levels of the hierarchy do not necessarily need to exist in every embodiment. FIG. 1D is an exemplary configuration, showing the ACP 40 (discussion of the ACP 40 herein can also infer reference to the associated system controller 30) that is connected to a number of regional lighting configurations 20. The ACP 40 can communicate via ports, such as an RS-485 port, or a networking port using, e.g., Ethernet, TCP/IP, etc. FIG. 1D shows that the different lighting components can be lighting module groups 60 or individual lighting modules 110 themselves (which could also be construed as a module group 60 having a single lighting module 110).

FIG. 2A is a bottom view of an exemplary lighting module 110. As can be seen, individual LEDs 130 A 1.1, 130 A1.4, can be organized into LED groups (the two noted LEDs belonging to LED group 120 A1. The LEDs 130 can be identical to each other (in terms of color or other operational characteristics), or they can be different. Similarly, the LED groups 120 can be identical to one another (e.g., 120 A1, 120A2), or can be different from one another (e.g., 120A1, 120 B1). The LEDs could be arranged in any configuration. FIG. 2B is a side cross-sectional view of the module 110 shown in FIG. 2A, illustrating an exemplary layout of the circuit components within the module case. Although FIG. 2B illustrates the power supply 70, filter 80, and module group controller 90 being arranged at a particular location on the PCB, the actual location of the components can be changed based on engineering design principles. For example, the power supply or other components could be flipped over on a back plate to facilitate heat transfer.

FIG. 3A shows a module 110 configured as a LRU, having a power plug assembly 112, and a terminating connector 114 that can be used to join the module 110 with additional modules 110.

Figure 3B:
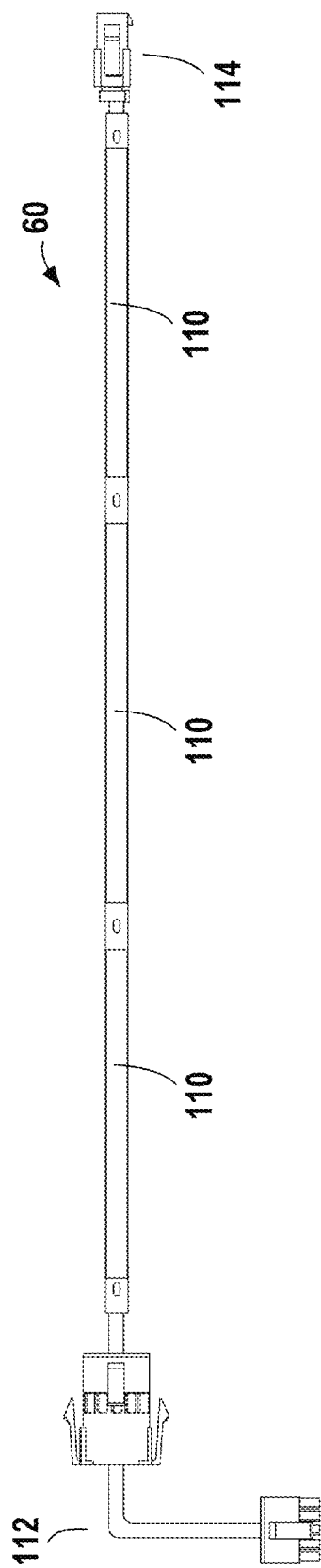
FIG. 3B is a pictorial view of an exemplary lighting module group.

As noted above, the modules 110 may be collected together into module groups 60, e.g., three modules 110 to a module group 60. FIG. 3B shows a collection of three such modules 110 arranged as a group 60. FIGS. 4A-C illustrate another arrangement of modules 110 into module groups 60, the modules 110 being arranged in a U-shaped parallel configuration.

Although FIGS. 4A-C show individual modules 110 that each have an extruded housing and are interconnected via plugs. However, it is also possible that the module groups 60 comprise a common housing and that the individual modules 110 are implemented as printed circuit boards within the housing and are joined together via, e.g., a jumper board, or other form of plug. These designs facility ease of assembly and ease of repair, and a modular configuration with housing and mounting brackets permits extremely easy and efficient installation and removal.

Figure 5:
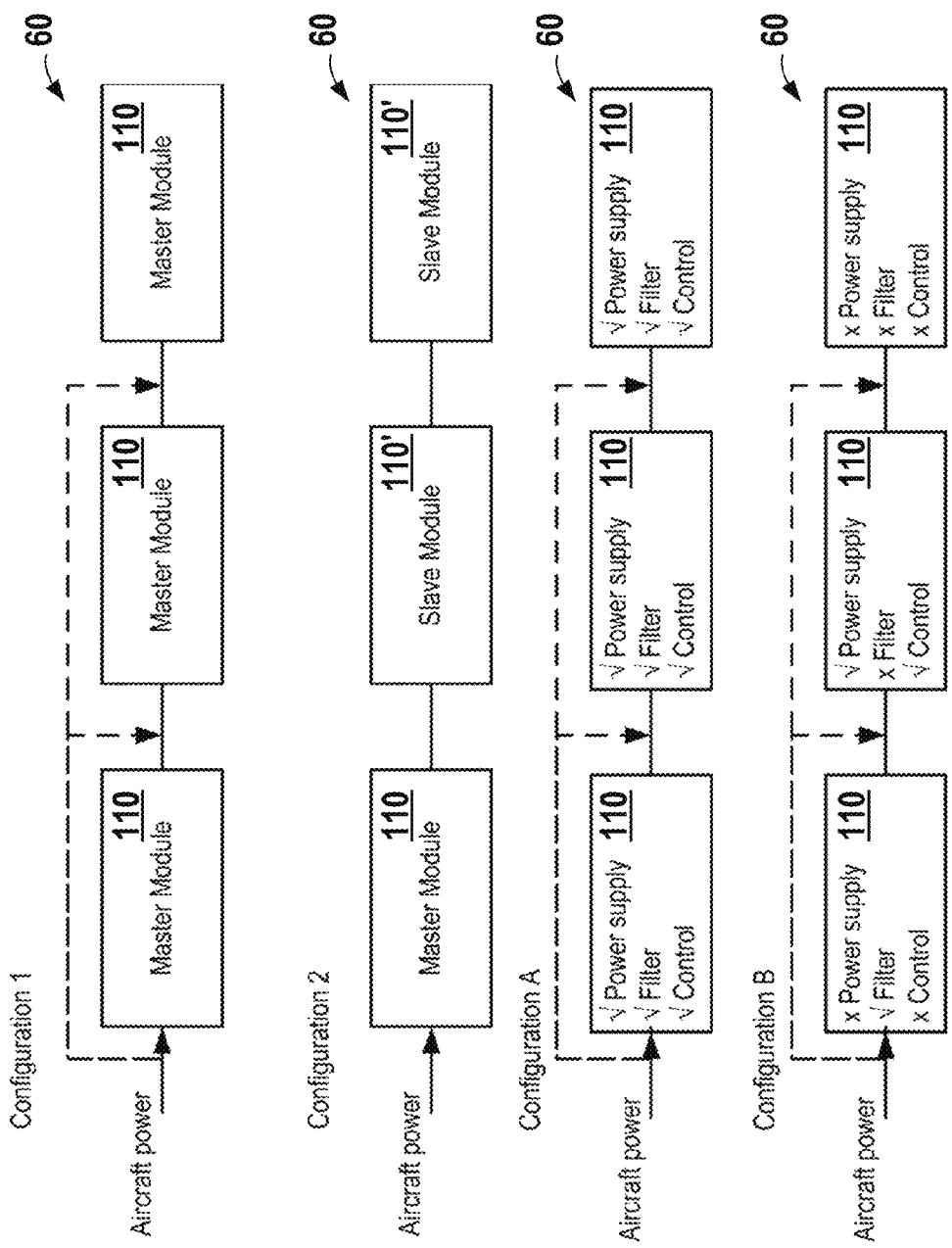
FIG. 5 is a block diagram illustrating various configurations of lighting module groups.

As is illustrated in FIG. 5, a module group 60, may comprise all master modules (Configuration 1) that are each externally connected to an external controller and controlled independently of one another. Or, (Configuration 2) the group may comprise any combination of master modules that are directly connected to and controlled by an external controller and slave modules 110' that receive communications and control signals through a connected master module 110.

Configuration A illustrates a module group 60 in which each module 110 comprises a power supply 70, a filter 80, and a controller 90. However, in Configuration B, it can be seen that the first module 110 only comprises a filter, whereas the second module 110 comprises the power supply 70 and control, and finally, the third module 110 does not comprise a power supply 70, filter 80, or controller 90. In this illustration, the third module 110 is a dummy that just accepts the power and control from a different module in the group.

For a module group 60, there can be one power supply 70 per unit or two power supplies 70 per unit preferably at opposite ends of the device and also preferably fitting within a washlight extrusion or within a bracket area at each end of the washlight. If more power is needed, the power supply 70 can also extend into a bracket area that connects lighting units together into an assembly, which can increase the power output capability.

The LEDs 130 can be fed from one or both power supplies 70 either in a linear array, alternating LEDs 130 or in a U-shaped array or any combination thereof. These configurations perform slighting differently when the LEDs 130 are powered up or if one string of LEDs goes out.

The two linear strip array approach also allows for light levels to be increased incrementally and independently which should help extend the life of the device because each power supply 70 could alternate their operation thus allowing each power supply 70 to run at lower than maximum levels and/or be off for periods of time to allow the power supply 70 to cool off. The power to a specific LED 130 can be controlled via modifying the voltage/current level to the LED or by a scheme such as pulse-width modulation, etc.

Also, additional external power supplies 70 that are preferably located within the bracket area can be added and controlled in the same manner above thus increasing the overall power output and life of the device.

As noted above, the modules 110 themselves or module groups 60 can collectively be controlled by a master or system controller 30. Such a master controller 30 can permit operation of the modules 110 or module groups 60 at a much higher functional level than has previously been possible.

Use of Scenes

A very high level of control involves defining various "scenes" that dictate certain lighting characteristics that can be applied, e.g., airplane-wide. The use of these high level scenes can greatly simplify complex lighting control, and can permit, e.g., a flight attendant, to select a scene from a few basic scenes to create a particular lighting pattern, using the attendant control panel (ACP) 40 that is connected to the system/main controller 30.

For example, a scene designated "entry/exit" or "cleaning/maintenance" might designate a maximum level of white lighting (e.g., 5000 Kelvin), whereas a scene of "daylight mid-flight" might designate a moderate level of lighting with a cooler color temperature (e.g., 3000 Kelvin) having more of a yellow component. A scene of "night-time sleeping" might designate a very dim blue lighting. In this way, specific predefined scenes can be used to easily control the cabin lighting. It is possible to provide an override that would let the specific level for each color group be manipulated from a user interface of the main control device.

The controller 30 itself may have corrective algorithms that permit precise adjustment of the LEDs 130 and that could, e.g., compensate for aging LEDs 130, color shifts, etc., over time. Similarly, the corrective algorithms could reside in the module groups 60 or modules 110 themselves.

Furthermore, when transitioning from one scene, or even color/level setting, specific algorithms can be implemented to effect a smooth transition—which is not necessarily a linear adjustment of each respective color. Thus, to adjust from 100% brightness to 20% brightness from white to blue, a linear adjustment might introduce an undesirable red component in the transition. Thus, in one embodiment, specific look-up tables (LUTs) can be provided that are used by the controlling processor(s) (system controller 30, and/or group/module controller 90) containing the necessary brightness values for properly adjusting during the transition. The control may be effected using software algorithms specifically designed for creating scenes and controlling the transitions.

Power Control

Furthermore, given certain restrictions on the use of power, it may be desirable to provide the control circuitry (in the system 30 and or group/module controller 90) with the ability to limit the overall power consumption to be within some specified limit, and this limit could vary depending upon the situation of the aircraft. This permits precise control of the system, even though the collective power consumption of the system might exceed predefined limits.

For example, the lighting system may, when fully engaged in its brightest configuration, consume 2000 W. However, there may be a limit imposed on power used in flight of 1000 W, whereas it is permissible to use the full 2000 W when on the ground and parked. In this scenario, the controller could ensure that no more than 1000 W is delivered to the lighting system when the plane is in the air.

One way to achieve this is to have a database of the power consumption characteristics for each module 110 associated with the master control 30. In the event that a request is received that would exceed the permissible values, the master control 30 could appropriately reduce the light levels to keep the system under the necessary limits. For example, if a flight attendant inadvertently selected the scene "entry/exit" with its maximum lighting requirement of 2000 W, the master controller could detect that this is improper and limit the levels to 50% or less so that the 1000 W cap is maintained.

Scene developer's software can be provided to ensure that no scene or mode will exceed a fixed or variable total power consumption for the entire lighting system 10, a given application type, LRU or device. The software can automatically regulate the wattage load and notify the user or programmer, etc., that the limit is being approached, has been met, or has been exceeded, and once met will not allow anymore devices to be added.

Additionally, the controller 30 can have another option to allow for random and/or identifiable priorities to be set for lighting applications, LRU's or devices so that a maximum power will not be exceeded by reducing the total power to selected applications, thus automatically scaling back the light output on lower priority applications while allowing more to others.

This may be linear or employ more complex relationships and algorithms and weighting factors to each load type. This is preferably done automatically without user intervention and displays and memory tables can be used to show and store lookup values respectively for current draw, wattage consumption, priority settings, etc., and this information along with the final configuration can be displayed in the manufacturing equipment, in field flight attendant panels, etc. This software may be stored in a master controller 30 or LCD display of the ACP 40 and information about individual lighting loads as requirements can also be sent (or preloaded) and stored in the lighting device (module group 60 and/or modules 110) itself, as required.

Summarizing and providing more detail, an aircraft lighting system 10 may incorporate numerous modules (modules 110 or groups 60), each comprising a plurality of LEDs 130. In this system 10, the following attributes can be provided: lights and groupings at any level (LED 130, LED group 120, module 110, module group 60, region 20, and whole system 10) can be, but do not need to be, individually addressable.

Advantageously, a hierarchy of "groups" or "zones" of lights and modules are provided in a manner that is easier to control and that allow the lights to function together. The system 10 can provide dynamic scenes that change over time, and these scenes can be simply controlled via control logic 30 associated with the Attendant Control Panel (ACP) 40.

In one embodiment, the lighting units (either modules 110 or module groups 60) as line-replaceable units (LRUs) can be shipped from the factory with pre-configured scene information already stored. A base set of scenes, such as those described above, could be programmed into the modules 110 or groups 60 so that they can be easily integrated into an existing system. The system 10 can also comprise a scene creation tool that permits a scene developer to design their own scenes and transitions between scenes. This could also be integrated with the power management tool to help ensure that maximum permitted power is not exceeded, or to help reduce power consumption costs. Additionally, in one embodiment, multiple intensities for the same scene can be designated. For example, the mid-flight scene could be provided in a High/Medium/Low/Night setting.

In a preferred embodiment, some system intelligence can be placed within a scene generation tool of the group 60 controller 90. In such a design, the lighting LRU 60 firmware in the controller 90 is simple, and the same. The system 10 can be designed to prohibit updating of the LRU 60 electrically erasable ($E^2$) memory in the field (under the design guide that devices returned to the factory should be in the same configuration they were when they left). In this scenario, controller communications are minimized, and a smaller bandwidth can be realized.

An exemplary LRU $E^2$ memory layout of scene data is provided below: (for the purpose of this illustration: High=0, Med=1, Low=2, Night=3). This assumes, of course, that four intensity settings will be provided for each scene (thus, all scenes will actually have four rows worth of data each in the memory layout), although this number could vary.

Unused scenes and/or intensity variations can simply have 0's for all light values (ensuring that they are off for that selection). Not all columns will be used by all light types, but all will be present on all lighting unit LRU's 60. The lighting LRU 60 type is preferably written to $E^2$ memory during a final calibration phase (along with the calibration data), when the unit is about to leave the production center. A serial number of the unit can be provided, and its characteristics can be associated and stored for later reference. The lighting LRU firmware can use the light type in its $E^2$ memory in order to determine which values to use.

The following table illustrates an exemplary arrangement for storing a scene table.

TABLE 1

Exemplary Scene Data Storage Table

| Scene # (1 byte) | Intensity (1 byte) | Red Value (2 bytes - 10 bits used) | Green Value (2 bytes - 10 bits used) | Blue Value (2 bytes - 10 bits used) | White #1 Value (2 bytes - 10 bits used) | White #2 Value (2 bytes - 10 bits used) | Amber Value (2 bytes - 10 bits used) | Scene Transition Time (millisec; 2 bytes) |
|---|---|---|---|---|---|---|---|---|
| 0 | 0 (High) | 0x0RRR | 0x0GGG | 0x0BBB | 0x0WWW | 0 | 0 | 0x7530 |
| 0 | 1 (Med) | 0x0RRr | 0x0GGg | 0x0BBb | 0x0WWw | 0 | 0 | 0x7530 |
| 0 | 2 (Low) | 0x0Rrr | 0x0Ggg | 0x0Bbb | 0x0Www | 0 | 0 | 0x7530 |
| 0 | 3 (Night) | 0x0rRR | 0x0gGG | 0x0bBB | 0x0wWW | 0 | 0 | 0x7530 |
| ... | ... | ... | ... | ... | ... | ... | ... | ... |
| 11 | 0 (High) | 0x0RRR | 0x0GGG | 0x0BBB | 0x0WWW | 0 | 0 | 0x7530 |
| 11 | 1 (Med) | 0x0RRr | 0x0GGg | 0x0BBb | 0x0WWw | 0 | 0 | 0x7530 |
| 11 | 2 (Low) | 0x0Rrr | 0x0Ggg | 0x0Bbb | 0x0Www | 0 | 0 | 0x7530 |
| 11 | 3 (Night) | 0x0rRR | 0x0gGG | 0x0bBB | 0x0wWW | 0 | 0 | 0x7530 |

Utilizing this philosophy, the entire scene table can occupy approximately 708 bytes of $E^2$ memory for 12 scenes. Calibration data may be stored in a similar fashion (as shown by the sample table below).

TABLE 2

Exemplary Calibration Data Storage Table

| Intensity (index) | Red Bias (2 bytes) | Green Bias (2 bytes) | Blue Bias (2 bytes) | White #1 Bias (2 bytes) | White #2 Bias (2 bytes) | Amber Bias (2 bytes) |
|---|---|---|---|---|---|---|
| 0 (High) | 0xRRRR | 0xGGGG | 0xBBBB | 0xWWWW | 0 | 0 |
| 1 (Med) | 0xRRRr | 0xGGGg | 0xBBBb | 0xWWWw | 0 | 0 |

TABLE 2-continued

Exemplary Calibration Data Storage Table

| Intensity (index) | Red Bias (2 bytes) | Green Bias (2 bytes) | Blue Bias (2 bytes) | White #1 Bias (2 bytes) | White #2 Bias (2 bytes) | Amber Bias (2 bytes) |
|---|---|---|---|---|---|---|
| 2 (Low) | 0xRRrr | 0xGGgg | 0xBBbb | 0xWWww | 0 | 0 |
| 3 (Night) | 0xrrRR | 0xggGG | 0xbbBB | 0xwwWW | 0 | 0 |

Thus the there can be one bias table entry (calibration offsets) for each intensity group. For the example shown of four intensities, the entire table will have four rows (occupy 48 bytes). If required, the bias table could be expanded so that every built-in scene has its own bias entry.

The preferred operation is that on LRU 60 power up, the firmware will load the scene for #0, High intensity and the bias table values for high into RAM, and attempt to establish communications over a communication link, such as RS-485 with the ACP 40. Failure to establish communication with the ACP 40 within a specified time interval can, e.g., result in this default scene being activated. This provides a failsafe mode in the event that the ACP 40 is broken, missing, or non-functional, and will allow there to be light on board the aircraft. An extra scene can be provided as the "failsafe" with little impact to memory requirements. Upon receipt of a valid command from the ACP 40 to change scene selection or intensity, the appropriate table entries can be loaded into RAM by the firmware, and the scene transitioning will start to occur.

Under this scheme, the ACP 40 does not need to "know" anything related to the default "canned scenes". It merely sends a broadcast message on all of its communication (e.g., RS-485) ports to change to scene #X, with intensity level Y), to elements at the regional 20, module group 60, or module 120 level. A one-time correlation can be made in the ACP 40 that, e.g., scene 1=Boarding/Disembark, 2=Safety Video, 3=Taxi/Takeoff/Ascent, etc., so that the display activation sends out the correct scene number to correspond to the data contained in the internal tables. This simple scheme satisfies all of the requirements for a baseline system.

Protocol Considerations

As previously stated, the ACP 40 will not have to do anything special for an "out of the box" system 10. It can merely broadcast and repeat (at predetermined intervals) the current scene number and intensity value. If a particular light type does not participate in that scene, its table entries will all be 0, and those lights will remain off.

The protocol can be configured to allow for BIT/BITE, LRU Grouping or Zones, Custom Scenes, and Maintenance Modes. The BIT/BITE sequence is rather simplistic—it is a request for address status, and a reply. If no reply is received, the fault is logged/displayed etc. Grouping or Zones preferably occur from the ACP 40.

A mechanism may be provided to tell each addressed LRU 60, 110 what group it belongs to (e.g., kept in RAM in the lighting LRU 60, 110). This should be resent by the ACP 40 at each system power up and on change (assuming the ACP 40 allows for dynamic moving of zones). The messages sent from the ACP 40 to the lighting LRUs 60, 110 can then incorporate the group number for which the scene/intensity change is directed. Only lighting LRUs 60, 110 that have been configured to be a member of that group or zone, will actually respond to the request for scene change.

In a preferred embodiment, the minimum packet size is 6 bytes, and the maximum packet size is 256 bytes Each scene change initiated at the ACP 40 can result in a notification message being broadcast to each LRU 60, 110 three times, spaced a predefined number of milliseconds apart. The ACP 40 can debounce scene selections (consecutive button presses) for, e.g., predefined number of milliseconds. The ACP 40 can periodically re-broadcast the current scene selection at predefined intervals.

A group value of "ALL" may also be included to force all lighting units when zones are employed. For the custom scene portion, the ACP 40 will once again need to be involved, since it would be undesirable to remove the lighting units and return them to the factory for addition of new scenes.

Basically, when the custom scene is selected, the ACP 40 can use a message to send the custom intensity values to the lighting LRUs 60, 110. When the lighting LRUs 60, 110 receive these commands, they then place the data into RAM and begin the scene transition. Custom scenes do not have to have any bias or calibration applied to them, since they may not have been developed at the production facility and calibrated for uniformity. Maintenance modes can be provided as well.

Scene Generation

A PC-based scene generation tool can be used as the brains of the system, and can incorporate any of the compensation equations for temperature and intensity variations. It is preferably the place to perform the calibration of LRU's as they leave the factory, since it can easily compare a database of expected values to measured ones, and calculate the necessary biases to achieve the desired results. It can also be used to limit system physical temperature and current draw. The tables that this tool may produce can have all of these factors taken into consideration, and may be what is eventually stored in the individual lighting LRUs 60, 110.

General Cabin Lighting Communications Protocol

As noted above, the general cabin lighting system 10 is used to illuminate the interior cabin of the aircraft. The system 10 may comprise two main parts, the lighting units (grouped 60 or modules 110) and the ACP 40. The ACP 40 may be used as the main interface point for cabin attendants and maintenance personnel. It allows input from users to execute the various cabin lighting scenarios inside the aircraft cabin. The lighting units 60, 110 are the physical units installed throughout the aircraft which are used to illuminate the aircraft cabin to the lighting scenarios selected.

The following description of different communication functions is split into four sections: Normal Operation, Addressing Operation, Bit/Bite Operation and other Misc Operations that may occur (loss of communications, decompression, etc.).

Normal Operation:

General Command Format:

<SOT> <DEVICE ID> <ADDR> <STATUS> <CMD>
<DATA> <D_TIME> <XOR CHECKSUM> <EOT>

-continued

| Device IDs: | Device ID |
|---|---|
| 9150 Ceiling Wash Lights (RGB + W) | <DEVICE ID> = "A" 0x41 |
| 9150 Sidewall Wash Lights (RGB + W) | |
| 9150 Cove Wash Lights (RGB + W) | |
| 9250 Over-Wing Wash Lights (RGB + WW) | |
| 9200 Cross-Bin Wash Lights (W + A) | <DEVICE ID> = "B" 0x42 |
| 92XX COS Wash Lights (W + A) | |

Note that certain lighting units behave identically to the another family of washlights. For example, the 9250-XXX family of washlights is virtually identical to the 9150 family of washlights except for the additional white LEDs that are powered and controlled by a separate dedicated 6VDC emergency power line.

Figure 6:
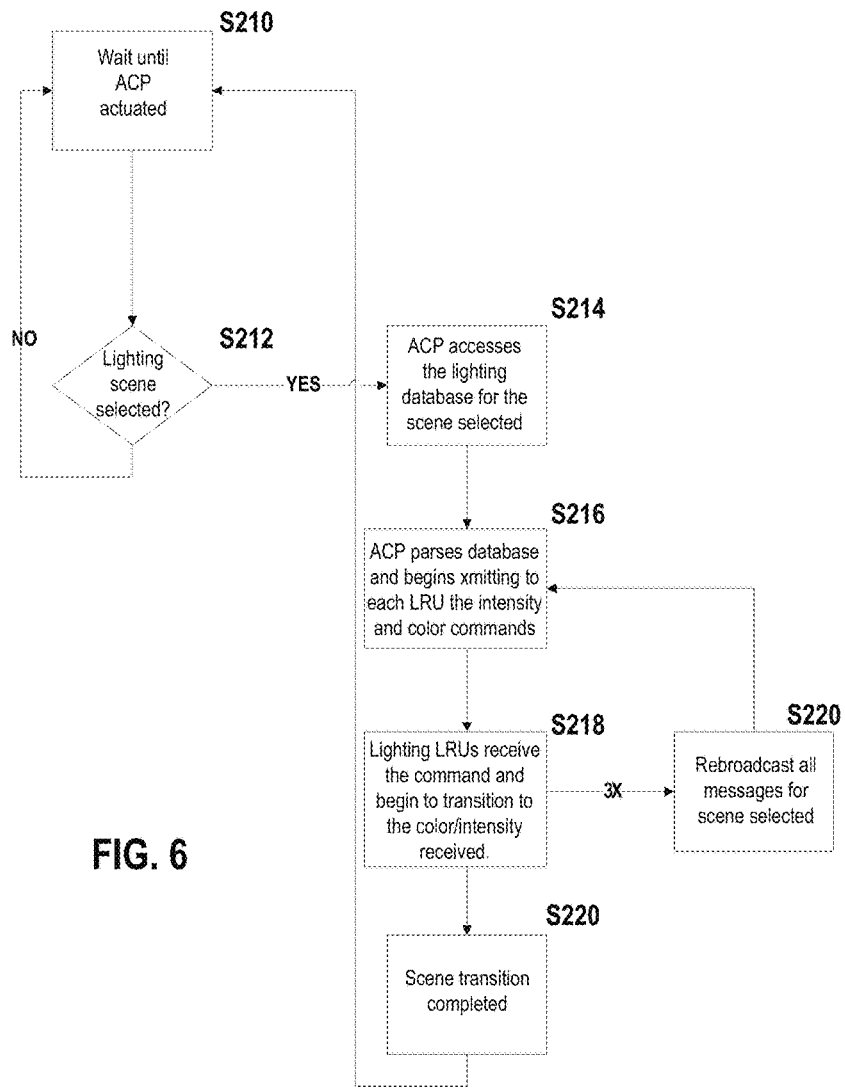
FIG. 6 is an exemplary flowchart for scene change using the ACP.

FIG. 6 is a flowchart illustrating normal operation. The system sits in an idle state and waits until the ACP is actuated S210. Once activated, it is determined whether a lighting scene is activated S212; if so the process continues on. The ACP accesses the lighting database for the scene selected S214, and then parses the database and begins transmitting to each LRU the intensity and color commands S216.

The lighting LRUs receive the command and begin to transition to the color/intensity received S218. A rebroadcast for all messages for scene selected S220 may be performed, and the scene transmission may then be completed S220 once the necessary rebroadcasting is complete. It should be noted that the ACP 40 and associated controller 30 can pass information to the LRUs 60, 110 at a very basic level (brightness level, color information, if possible) to the addresses, e.g., of each individual LED 130. It could also send information to LED groups 120. At a higher level, the information regarding which scene should be activated and be provided as well.

The communication to and between groups 60, modules 110, the system controller 30, etc., can be done via an RS-485 multi-drop bus, which can handle up to 255 devices and at a rate of 115200 bps. An exemplary command is provided below.

9150-XXX Ceiling, Sidewall, Cove and Direct Washlights (RGB+W)
Protocol

TABLE 3

Exemplary Protocol

| Command Format | <SOT> | <DEVICE ID> | <ADDR> | <CMD> | <DATA> | <D_TIME> | <XOR CHECKSUM> | <EOT> |
|---|---|---|---|---|---|---|---|---|
| Bytes | 1 | 1 | 1 | 1 | 8 | 2 | 2 | 1 |
| Data | 0x01 | 0x41 | 0x20-0xFF | CMD | DATA | D_TIME | ASCII XOR XSUM | 0x04 |

CMD Set Description

| | |
|---|---|
| <SOT> | = 0x01 - Start of Transmission Character |
| <EOT> | = 0x04 - End of Transmission Character |
| <DEVICE_ID> | = 0x41 - The Device ID for the 9150 and 9250 family of wash lights |
| <ADDR> | = 0x21 - 0xFF, 0x20 offset + 5 bit address value, MAX possible devices = 222 |
| | 0x20 = the general broadcast address. |
| | All 9150 family washlights will accept intensity commands with this address. |

Intensity Command:

| | |
|---|---|
| <CMD> | = "A" 0x41 - The Intensity command changes the intensity of the wash lights |
| <DATA> | = R1, R2, G1, G2, B1, B2, W1, W2 |
| Rx | The Red intensity value is 10 bits wide and split into 2 bytes, R1 and R2. |
| R1 | = 0x20 offset + Most Significant 5 of 10 bits (RED) |
| R2 | = 0x20 offset + Least Significant 5 of 10 bits (RED) |
| | **R1, R2 = If R1 and R2 = 0xC0 then the intensity value is to remain unchanged |
| Gx | The Green intensity value is 10 bits wide and split into 2 bytes, G1 and G2. |
| G1 | = 0x20 offset + Most Significant 5 of 10 bits (GREEN) |
| G2 | = 0x20 offset + Least Significant 5 of 10 bits (GREEN) |
| | **G1, G2 = If G1, G2 = 0xC0 then the intensity value is to remain unchanged |
| Bx | = The Blue intensity value is 10 bits wide and split into 2 bytes, B1 and B2. |
| B1 | = 0x20 offset + Most Significant 5 of 10 bits (BLUE) |
| B2 | = 0x20 offset + Least Significant 5 of 10 bits (BLUE) |
| | **B1, B2 = If B1, B2 = 0xC0 then the intensity value is to remain unchanged |
| Wx | = The White intensity value is 10 bits wide and split into 2 bytes, W1 and W2 |
| W1 | = 0x20 offset + Most Significant 5 of 10 bits (WHITE) |
| W2 | = 0x20 offset + Least Significant 5 of 10 bits (WHITE) |
| | **W1, W2 = If W1, W2 = 0xC0 then the intensity value is to remain unchanged |
| <D_TIME> | = D1, D2 |
| Dx | The scene transition time <D_TIME> represents the number of seconds the scene will be transitioning. It is a 10 bit wide value and split into 2 bytes, D1 and D2. |

| | |
|---|---|
| D1 | = 0x20 offset + Most Significant 5 of 10 bits |
| D2 | = 0x20 offset + Least Significant 5 of 10 bits |

Addressing Operation:

As noted above, each lighting unit may incorporate an address. This address helps to identify the location of the lighting unit in the aircraft. Using a lighting layout of passenger accommodation (LOPA), an individual could determine the exact position of the light in the aircraft. Addressing each light makes the system capable of handling multiple zones of lighting, and also allows the systems to do built-in test equipment (BITE) testing to locate faulty LRUs.

The ACP 40 and associated controller 30 can control addressing of the washlights. The ACP 40 can use a Token communications line in addition to the RS485 line to help address the washlights. Each Washlight LRU may have an RS485 transceiver, Token-In, and Token-Out Lines.

The Token Lines may be used to identify which washlight is currently being addressed. If a washlight's Token-In line is active, then the washlight is currently being addressed and any Address Input Messages are intended solely for that device. If the washlight receives the address input message it can acknowledge the receipt of an address with an Address ACK Message. This signifies that addressing is complete for the device and it is time to move on to the next device. Next, the ACP 40 can pass the token by sending a Pass Token Command which will allow the next washlight in the column to be addressed. Once this is received, the currently addressed washlight will set its Token-Out line active so that the next sequential washlight can be addressed. In conjunction, the previous addressed device will set its Token-Out line inactive to complete addressing operations for the currently addressed unit.

Figure 7:
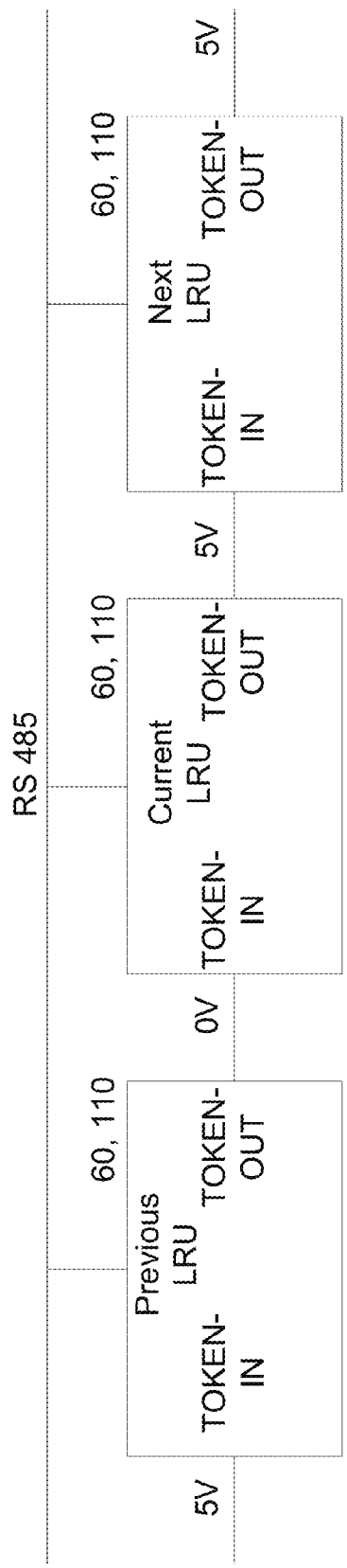
FIG. 7 is a block diagram illustrating an exemplary connection of LRUs to an RS 485 communications bus.

FIG. 7 illustrates this addressing. In FIG. 7, the Center LRU is currently being addressed since its Token-In Line is active (Pulled to ground) by the previously addressed LRU. The Specifications for this communication are as follows:

Control Method: RS485 Half-Duplex
RS485 Transceivers Load: ⅛ Load, Max possible devices=255
Baud Rate: 115200 bps
Baud Rate Tolerance: ±185 bps
Message Frequency Messages in Address mode should have a 50 ms pause between commands.
Token Line $V_{IH}$: 4.7VDC MIN in respect to the washlights Token Ref Line.
Token Line $V_{IL}$: 0.3VDC MAX in respect to the washlights Token Ref Line.
Protocol

| Command Format | <SOT> | <ADDR> | <CMD> | <XOR CHECKSUM> | <EOT> |
|---|---|---|---|---|---|
| Bytes | 1 | 1 | 1 | 2 | 1 |
| Data | 0x01 | 0x20-0xFF | CMD | ASCII XOR XSUM | 0x04 |

CMD Set Description

| | |
|---|---|
| <SOT> | = 0x01 - Start of Transmission Character |
| <EOT> | = 0x04 - End of Transmission Character |
| <ADDR> | = 0x21 - 0xFF, 0x20 offset + 5 bit address value, MAX possible devices = 222 |
| | 0x20 = the general broadcast address. And as such is not used. |
| Address Input Message: | |
| <CMD> | = "A" 0x41 - This command sets the washlights address. |
| Address ACK Message: | |
| <CMD> | = "B" 0x42 - This command is the acknowledgement message from the washlight. |
| Pass Token Command: | |
| <CMD> | = "C" 0x43 - This command tells the washlights to pass the token |

Example Message Format

ACP sends:

Byte 1: 0x01
Byte 2: 0x21
Byte 3: 0x41
Byte 4: 0x33
Byte 5: 0x34
Byte 6: 0x04

Washlight Responds:

Byte 1: 0x01
Byte 2: 0x21
Byte 3: 0x42
Byte 4: 0x33
Byte 5: 0x37
Byte 6: 0x04

ACP sends Pass Token Command:

Byte 1: 0x01
Byte 2: 0x21
Byte 3: 0x43
Byte 4: 0x33
Byte 5: 0x36
Byte 6: 0x04

Bit Bite Operation

The ACP 40 with control 30 controls when BIT/BITE is initiated. The ACP can use the RS485 line to help poll each washlight in the system to determine if the washlight is still active. In addition to polling each device the ACP can send out a lamp test message that will turn on each one of the LEDs on each LRU so a visual check may also be performed.

Protocol

| Command Format | <SOT> | <ADDR> | <CMD> | <XOR CHECKSUM> | <EOT> |
|---|---|---|---|---|---|
| Bytes | 1 | 1 | 1 | 2 | 1 |
| Data | 0x01 | 0x20-0xFF | CMD | ASCII XOR XSUM | 0x04 |

CMD Set Description

| | |
|---|---|
| <SOT> | = 0x01 - Start of Transmission Character |
| <EOT> | = 0x04 - End of Transmission Character |

| | |
|---|---|
| <ADDR> | = 0x21 - 0xFF, 0x20 offset + 5 bit address value, MAX possible devices = 222 0x20 = the general broadcast address. And as such is not used |

BIT/BITE Request:

| | |
|---|---|
| <CMD> | = "A" 0x91 - This command polls the washlight for status. |

BIT/BITE ACK Message:

| | |
|---|---|
| <CMD> | = "B" 0x92 - This command is the acknowledgement message from the washlight. |

Misc Operations

A number of miscellaneous operations may also be provided by the system 10.

Checksum Calculation:

A checksum calculation is provided to help insure the integrity of the transmitted data. The checksum calculation may be a one byte XOR checksum of all the bytes including the SOT byte to the last byte before the checksum value. The checksum has a XOR PRESET of 0x55. After the checksum calculation is completed the byte is split into the ASCII representation of the value. So if the value=0xA3, the Checksum values in the message protocol would be 0x41 and 0x33. Below is the C code which does the Xsum calculation on the message and the method which converts it to binary.

Decompression Signal:

The washlights have no direct decompression signal message. If the ACP receives a decompression signal then the ACP should simply send a 100% white intensity command to all lighting units.

Loss of Communications:

If an LRU losses communications with the ACP, it may remain in the last state which it was commanded.

Device Calibration

Corrective algorithms and look-up tables may be utilized to calibrate lighting devices for color matching, white color temperature matching, matching over various intensities and use of various LED manufacturers. This may be done at the individual device, LRU, subassembly and complete application level. Corrections may be performed and stored in the lighting devices, LRUs and/or other remote devices including master controllers, etc.

Corrective algorithms and look-up tables may be utilized to calibrate lighting devices for color matching, white color temperature matching, matching over various intensities and use of various LED manufacturers (to accommodate variations between manufacturers). This can be done at the individual device (LED 130, LED groups 120), LRU (module 110, module groups 60), subassembly (module groups 60, regional lighting groups 20) and complete application (system 10) level. Corrections may be performed and stored in the lighting devices, LRUs 60, 110 and/or other remote devices including master controllers 30, etc.

It has been recognized that lighting devices 130 can change over time and can change based on usage (power) and environmental conditions. For example, where a change over the lifetime of an LED is known, the operation time of a module 110 can be tracked, and look-up tables can be provided to compensate and adjust for the change over time. Thus, if an LED was known to fall off to 98% brightness after 200 hrs. use, the time for the module could be tracked and at 200 hrs., a new adjustment value could be applied for that module, or, since it is possible to address LED groups and even single LEDs, it could be possible to resolve the new adjustment values down to the single LED level, if desired. By using look-up tables (LUTs), known variance characteristics of LEDs over time can be compensated for. As noted previously, these tables can reside at the system level on the system controller 30, at the module group/module level on the group controller 90, or could be shared between the two.

Similarly, characteristics that vary over temperature could be similarly provided in LUTs or some other form of database. Thus, when the modules 110 are ready to ship from the manufacturer, an initial calibration procedure may be performed to determine the exact color wavelength or x, y coordinates on a color chromaticity diagram, and predetermined tables capable of correcting the LEDs as they age or as they are operated at different temperatures can be provided prior to shipment of the manufactured device.

Furthermore, the LUTs or other database parameters could be fixed, or, preferably, could be updatable so that as new characteristics of the LEDs is learned, the tables can be adjusted accordingly. In this way, corrective adjustments based on temperature and lifetime use of the modules can be provided.

In one embodiment, calibration can be done via an internal and/or external optical sensor that accurately reads the color and intensity information produced by a module 110 or module group 60, and adjustment information can be determined based on this feedback. Updated adjustment information can then be provided directly or indirectly into the lighting device, LRU 60, 110, master controller 30, etc.

Color Mixing Method

In order for a lighting module 110 to produce specific desired color set points (which includes both color and intensity or luminous flux), multiple LEDs 130 of different types are used in combination such that their mixed light outputs produce the specific desired colors and the desired overall luminous flux. For example, a lighting module 110 may include LEDs 130 that produce colors in each of three primary colors red, green, blue, and white. The lighting module 110 may also include LEDs 130 that produce colors in each of cool white, warm white, and amber. The mixing of the colors of the LEDs to produce the desired color set points may be performed according to known color map characteristics and the specific calibration data for each of the LEDs 130 in the lighting module 110. For example, an LED lighting module 110 that includes LED groups 120 having red, green, blue, and white (RGBW) LEDs 130 may undergo a calibration procedure to determine the actual color coordinates of the RGBW LEDs 130 at a measured temperature. Thereafter, during operation of the LED lighting module 110, a color mixing method may use this data in conjunction with an input specific desired color set point including target color coordinates and total flux value to compute a duty cycle ratio of each of the RGBW LEDs 130 which will produce the specific desired color set point for the overall LED lighting module 110. While the descriptions that follow use the RGBW LEDs as examples, the methodology is also applicable to the set of cool white, warm white, and amber LEDs, any combination of three or more LEDs from within the two sets, and any other potential combination of three or more LEDs.

Figure 8:
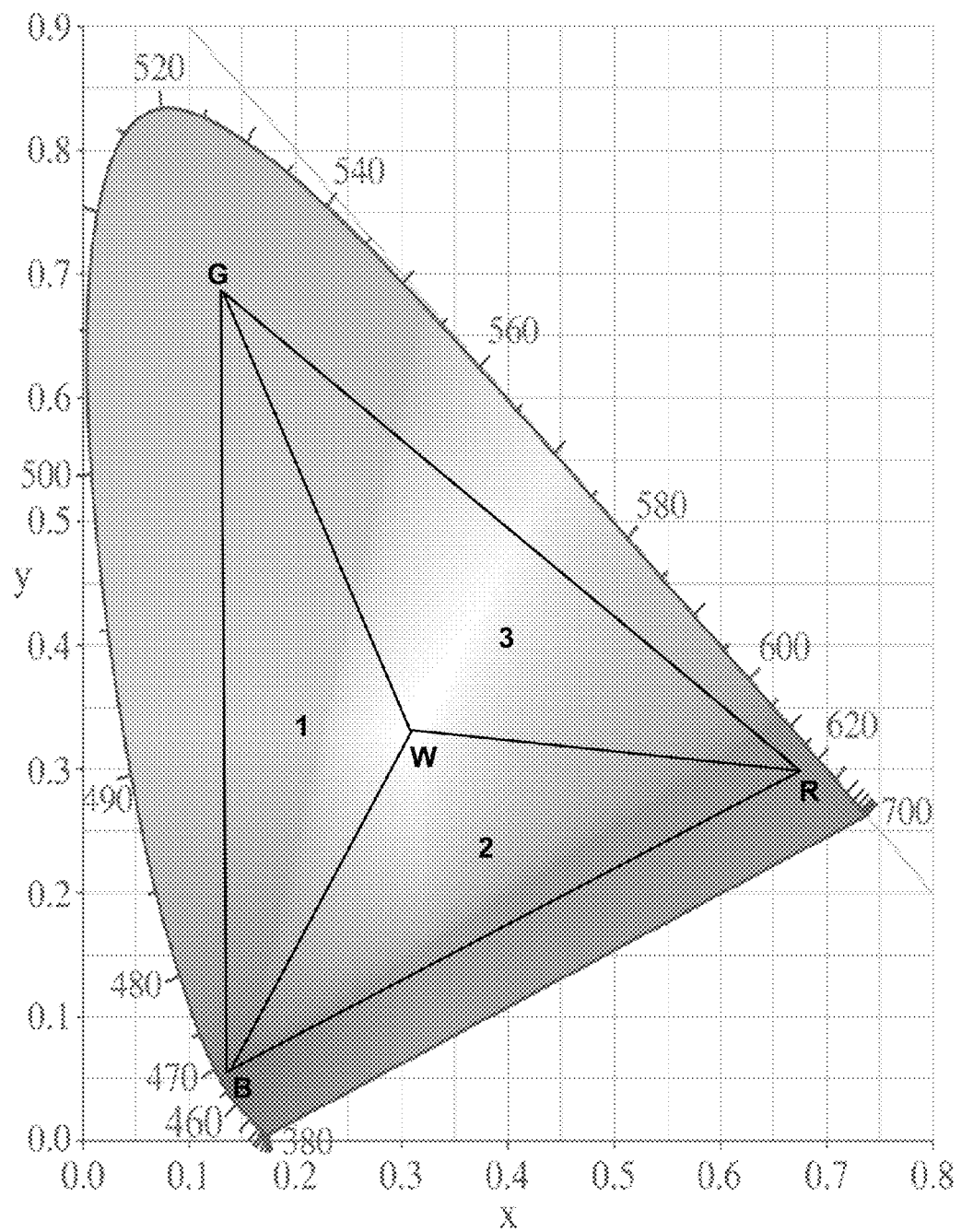
FIG. 8 illustrates a CIE 1931 chromaticity diagram.

FIG. 8 illustrates a CIE 1931 chromaticity diagram. The CIE 1931 chromaticity diagram illustrates on a two-dimensional (x, y) graph all the colors which the normal human eye can perceive. The set of parameters x and y of the chromaticity diagram and an additional luminance parameter Y characterize each visible color in the CIE system, and define the CIE xyY color space. In the CIE xyY color space, the parameters are based on the spectral power distribution (SPD) of the light emitting from a colored object and are factored by measured color sensitivity curves of the human eye. In a lighting module 110 that includes red, green, blue, and white LEDs, a specific desired color set point on the chromaticity diagram may be realized by mixing different intensities of each of the red, green, blue, and white LED light outputs together. Variations in the light outputs of the specific LEDs 130 within a specific lighting module 110 may be compensated for by use of calibration data acquired for the specific LEDs 130.

Specific desired color set points within the chromaticity diagram may only be realized using the specific red, green, blue, and white (RGBW) LEDs 130 of the lighting module 110 when the specific desired color set points fall within geometric zones defined by lines connecting the output colors of each of the specific red, green, blue, and white LEDs 130, as illustrated in FIG. 8. Thus, desired color set points within illustrated zone 1 may be realized using GBW LEDs, desired color set points within illustrated zone 2 may be realized using RBW LEDs, and desired color set points within illustrated zone 3 may be realized using RGW LEDs. In addition, any desired color set point within any of zones 1, 2, and 3 may be realized using RGB LEDs. However, white LEDs tend to be more efficient than red, green, and blue LEDs, so the use of white LEDs improves efficiency in the aircraft lighting system 10 compared to the use of red, green, and blue LEDs alone.

The required specific intensity values of each of the LEDs 130, and consequently the specific input electrical power to each of the LEDs 130, to achieve a specific desired color set point in the lighting module 110 depends upon the actual color characteristics of each of the LEDs as determined by calibration. Thus, a mapping of the RGBW points and zones 1, 2, and 3 onto the chromaticity diagram may be unique to each installed lighting module 110.

Figure 9:
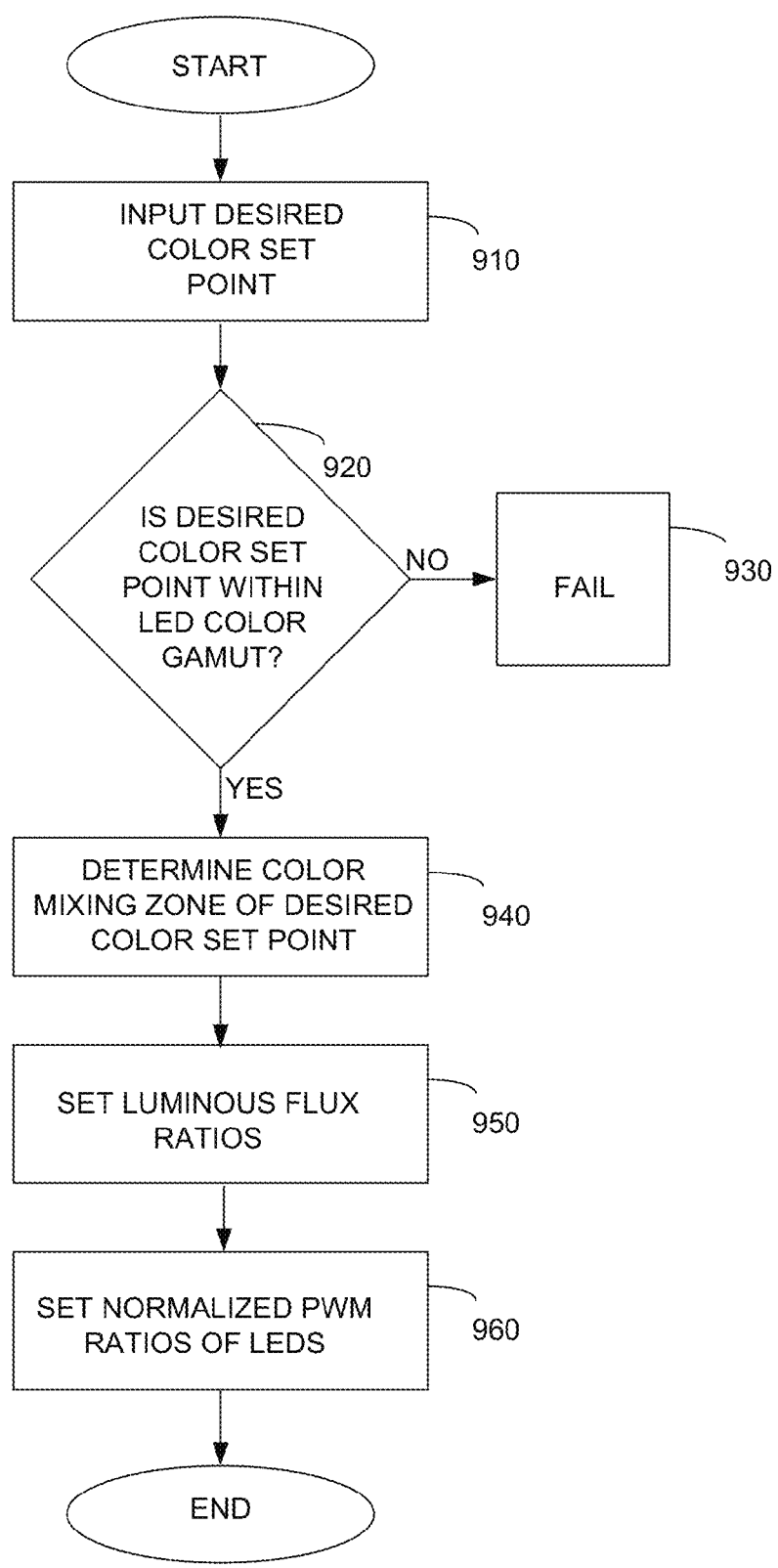
FIG. 9 illustrates a method of mixing the light output from multiple LEDs of different colors to produce a desired color set point.

FIG. 9 illustrates a method of mixing the light output from multiple LEDs 130 of different colors to produce a desired color set point. During calibration, the method of FIG. 9 may be performed by the PC controlling the calibration. The method of FIG. 9 may also be employed during operation of the lighting module 110, in which case the method may be performed by a controller within the LED lighting module 110, within the module group controller 90, or other location which controls the LEDs 130 of the LED lighting module 110.

In a step 910, a desired color set point on the CIE 1931 chromaticity diagram ($x_d$, $y_d$) for the LED lighting module 110 is input. In a step 920, a determination is made as to whether the desired color set point ($x_d$, $y_d$) is within the color gamut of the LEDs 130 of the LED lighting module 110. If the desired color set point ($x_d$, $y_d$) is determined to not be within the color gamut of the LEDs 130 of the LED lighting module 110, the method fails in a step 930. During calibration, the PC may indicate to an operator that the lighting module 110 has failed calibration. Alternatively, during operation of the lighting module 110, for example, in step 930, a default light output mixture of the multiple LEDs 130 may be set, such as all on at 25% power, 50% power, 75% power, 90% power, or 100% power. Alternatively, during operation of the LED lighting module 110, in step 930, a color reasonably close or closest to the desired color set point which is within the color gamut of the LEDs 130 may be chosen, and the method may continue to step 940.

In a step 940, which of one or more color mixing zones defined by the plurality of different color LEDs 130 of the LED lighting module 110 within which the desired color set point lies is determined. The color mixing zone may be defined by a triplet of three different primary color points ABC represented in the CIE 1931 XYZ color space corresponding to three different color LEDs 130 of the LED lighting module 110. For example, when the LED lighting module 110 includes LEDs 130 of four different colors (e.g., RGBW), which of three potential color mixing zones the desired color set point lies within is determined (e.g., GBW, RBW, and RGW). For example, the GBW zone may be determined when $y_d$ is less than the y value of the line between the G point and the W point at the point $x_d$, and $y_d$ is greater than a y value of the line between the B point and the W point at the point $x_d$; the RBW zone may be determined when $y_d$ is less than the y value of the line between the B point and the W point at the point $x_d$, and $y_d$ is less than a y value of the line between the R point and the W point at the point $x_d$; and the GRW zone may be determined when $y_d$ is greater than the y value of the line between the G point and the W point at the point $x_d$, and $y_d$ is greater than a y value of the line between the R point and the W point at the point $x_d$. If the desired color set point is determined to fall on the border between two color mixing zones, either color mixing zone may be arbitrarily chosen to represent the desired color set point. The choice of which color mixing zone the desired color set point lies within may be made more efficiently by searching within the zones in the order of their percentage of coverage of the CIE 1931 chromaticity diagram.

In a step 950, the luminous flux ratios of each of the LEDs 130 in the LED lighting module 110 are set according to the determined color mixing zone to produce the desired color set point. For example, if the desired set point is determined in step 940 to be within the GBW zone, the luminous flux ratio of the red (R) LEDs 130 would be set to substantially zero, and the luminous flux ratios of each of the green (G), blue (B), and white (W) LEDs 130 would be set appropriately to mix to produce the desired color set point on the chromaticity diagram. The following equations may be used to set the input power levels to each of the triplet of different color LEDs 130 in the LED lighting module 110 which are at the endpoints of the color mixing zone determined in step 940:

$$R_A = \frac{S_{BCM}}{S_{ABC}};$$

$$R_B = \frac{S_{ACM}}{S_{ABC}};$$

$$R_C = \frac{S_{ABM}}{S_{ABC}}.$$

where $R_A$, $R_B$, and $R_C$ are the flux ratios of each of the three colors A, B, and C at the endpoints of the determined color mixing zone; M is the desired color set point within the triangle defined by A, B, and C; D is the endpoint of a line drawn from the endpoint C through the desired color set point M to a line connecting endpoints A and B of the determined color mixing zone; and $S_{ABC}$, $S_{BCM}$, $S_{ACM}$, and $S_{ABM}$ are the areas of the triangles formed by the respective endpoints ABC, BCM, ACM, and ABM of the determined color mixing zone.

Alternatively, the flux ratios may be calculated based on the lengths of the line segments. In this case, the equations are as follows:

$$R_A = \frac{DB \cdot MC}{AB \cdot CD};$$

$$R_B = \frac{DA \cdot MC}{AB \cdot CD};$$

$$R_C = \frac{MD}{CD}.$$

where DB represents the distance between endpoints D and B, MC represents the distance between endpoints M and C, AB represents the distance between endpoints A and B, CD represents the distance between endpoints C and D, DA represents the distance between endpoints D and A, and MD represents the distance between endpoints M and D.

In a step 960, the normalized PWM duty cycle ratios each of the LEDs 130 in the LED lighting module 110 are set according to the luminous flux ratios determined in step 950. Because a luminous flux level of each of the triplet ABC of LEDs 130 defining the determined color mixing zone is different at a same PWM duty ratio, the duty ratios are normalized to produce the desired color set point corresponding to the luminous flux ratios determined in step 950. A multiplication factor may be determined by which the luminous flux ratio of each of the different color LEDs 130 is multiplied to arrive at the corresponding normalized PWM duty ratio. The multiplication factors may be set such that of a plurality of different color LEDs (e.g., four) among the LEDs 130, the multiplication factor for one of the plurality is one, and the multiplication factors for the others of the plurality are set to normalize their PWM duty ratios to the PWM duty ratio of the one of the plurality. Using the example of RGBW color LEDs, the PWM duty ratios of each of the RGBW color LEDs may be computed according to the following equations:

$$PWM_R = R_R;$$

$$PWM_G = k_G \cdot R_G;$$

$$PWM_B = k_B \cdot R_B;$$

$$PWM_W = k_W \cdot R_W.$$

where $k_G$, $k_B$, and $k_W$ are the normalization multiplication factors for each of the respective colors G, B, and W by which the ratios $R_G$, $R_B$, and $R_W$ are multiplied to arrive at their respective PWM duty ratios normalized to the $PWM_R$ duty ratio. The values of $k_G$, $k_B$, and $k_W$ can be computed according to the following equations:

$$k_R = 1;$$

$$k_G = \frac{y_G F_R}{y_R F_G};$$

$$k_B = \frac{y_B F_R}{y_R F_B};$$

$$k_W = \frac{y_W F_R}{y_R F_W};$$

$$F = 683.002 \cdot Y.$$

where $y_R$, $y_G$, $y_B$, and $y_W$ are the y coordinates in the CIE xyY color space corresponding to the R, G, B, and W color LEDs 130, respectively; and $F_R$, $F_G$, $F_B$, and $F_W$ are the F values corresponding to the R, G, B, and W color LEDs 130, respectively, in which Y is the Y coordinate in the CIE XYZ color space corresponding to the R, G, B, and W color LEDs 130.

Calibration Methods

Calibration methods may be employed to create data for use in lookup tables during operation of the LEDs 130. Calibrations of an LED lighting module 110 may be performed in a calibration chamber, the data may be transmitted to the module group controller 90 of a lighting module group 60 that includes the calibrated LED lighting module 110 (e.g., using RS-485 messages), and the calibrated LED lighting module 110 may then be controlled in a calibrated manner by the controller 90 such that the LED lighting module 110 provides a consistent lighting color and intensity output over its life without further calibration or adjustment, and without a closed-loop control system using real-time feedback. The data in the lookup tables may be used during operation of the LEDs 130 to map an incoming lighting command signal value to an LED input electrical power value that produces the desired LED output light characteristics corresponding to the incoming lighting command signal value. The data in the lookup tables may take into account manufacturing variances, operating temperature, and age of the LEDs 130.

In an exemplary application of the aircraft lighting system 10, there may be a fixed number such as sixteen (16) or thirty-two (32) predefined target color points k which the LED lighting modules 110 are intended to reproduce. Each predefined target color point may be represented as an x,y coordinate in the CIE 1931 xyY color space, as well as the target point luminous flux Y. Each predefined target color point may also be represented as X, Y, Z coordinates in the CIE 1931 XYZ color space. Calibration methods may be used to populate a lookup table that identifies characteristics for the LEDs 130 of the LED lighting module 110 associated with each of the predefined target color points so that driving conditions of the LEDs 130 may be adjusted to reliably produce the desired target color points using the LED lighting module 110 given variations in manufacturing tolerances, temperature, and age of the LEDs 130. For example, for each predefined target color point k, an entry in the lookup table may represent the measured CIE 1931 xyY color space data points x, y, and Y (flux φ) and actual PWM duty ratios for each of the four color LEDs 130 (RGBW) that produce the predefined target color point k at a measured temperature $T_0$ as the following matrix:

$$M_k(T_0) = \begin{bmatrix} x_r & x_g & x_b & x_w \\ y_r & y_g & y_b & y_w \\ \phi_r & \phi_g & \phi_b & \phi_w \\ d_r & d_g & d_b & d_w \end{bmatrix}$$

In other words, the table $M_k(T_0)$ indicates the measured CIE 1931 xyY color space data points (x, y, φ) for each of the red, blue, green, and white (RGBW) LEDs 130, and their respective PWM duty ratios d, which mix to produce the target color k at a measured temperature of $T_0$. The index value k may refer to a line in the aircraft lighting system 10's scene data storage table (Table 1).

Calibrations may be performed prior to installation by placing an individual LED 130, an LED group 120, an LED lighting module 110, or an entire module group 60 into a calibration chamber which is specifically equipped for performing LED calibrations. For example, the calibration chamber may be temperature controlled and equipped with sensors to measure operating temperatures and light output characteristics (e.g., color points) of the LEDs under test such as color and intensity. Calibration of the LEDs in the calibration chamber may be intended to determine the input electrical power values or PWM duty cycles each LED requires in order to produce the desired color points over different operating temperatures.

In an embodiment, an LED lighting module 110 may be placed in the calibration chamber and driven using PWM power signals provided using a computer (e.g., a PC) which controls the calibration. The PWM power signal may be varied while the color point produced by the LED lighting module 110 is monitored. A table of input PWM power signal values vs. color points may be saved by the PC, including the specific PWM power signal values that produce each desired color point. The calibration may also be performed across a range of operating temperatures. The resulting lookup table data may also be extrapolated to include projected aging characteristics for the LED under test. The lookup table data may be stored within the lighting module 110 under test, an associated module group controller 90, or other appropriate location associated with the control of the LEDs 130 of the LED lighting module 110 after installation. In addition to the lookup table data, a serial number, part number, and LED manufacturing lot IDs may be stored in association with the calibrated LEDs 130. This additional data may support loading new temperature and lifetime correction tables for the calibrated LEDs 130.

Figure 10:
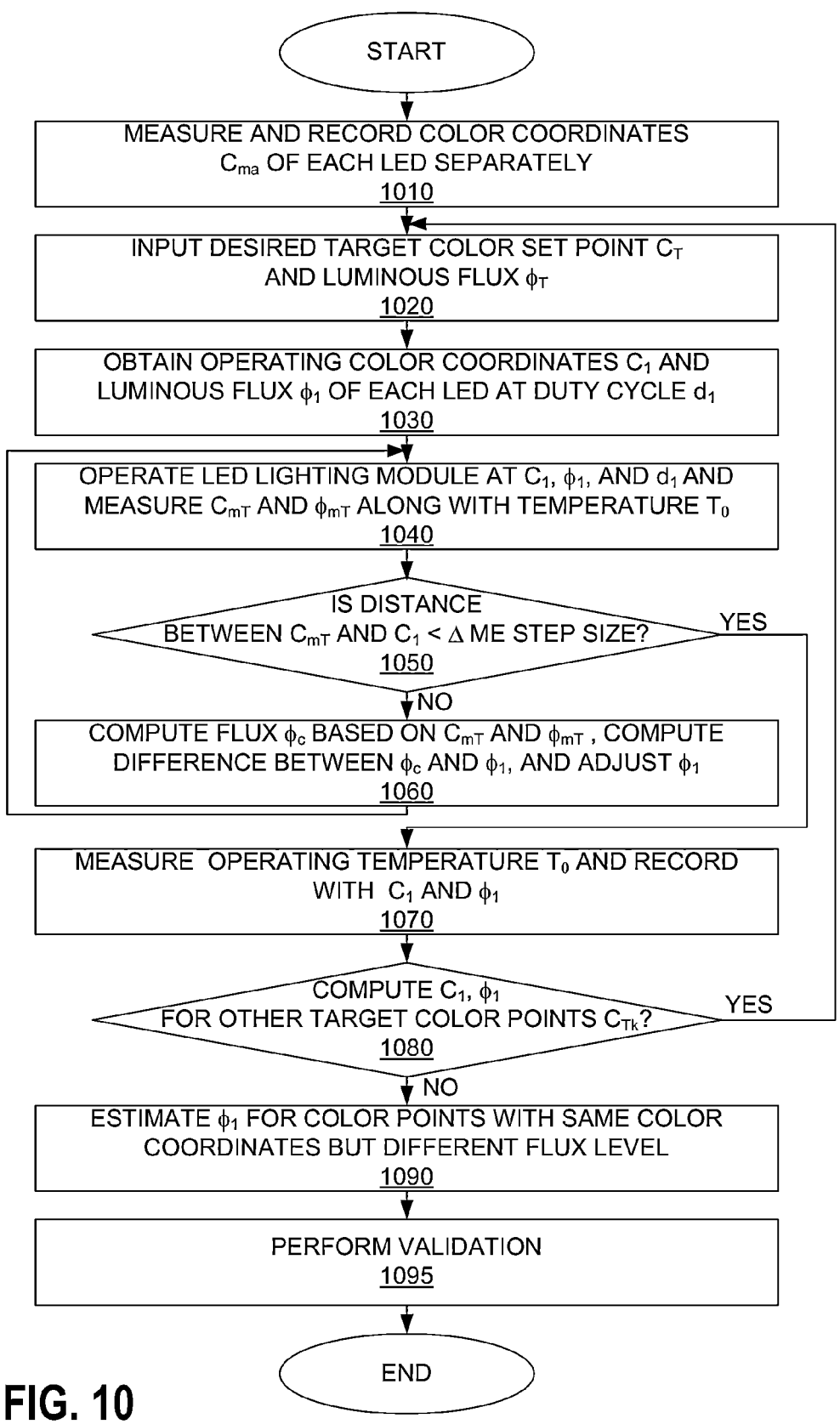
FIG. 10 illustrates a method of calibrating an LED lighting module.

FIG. 10 illustrates a method of calibrating an LED lighting module 110. In a step 1010, the color coordinate $C_{ma}$ in CIE 1931 XYZ space of each of the LEDs 130, e.g., red (R), green (G), blue, (B), and white (W), is measured and recorded. The color coordinates $C_{ma}$(R, G, B, W) may be measured while operating the LEDs 130 at a specific PWM duty cycle, such as 25%. Then, calibration data corresponding to other PWM duty cycles may be computed without additional measurements using known LED flux characteristics to save time in performing the calibrations. Alternatively, for more accurate calibration data at the expense of greater calibration time, the measurements could be made at a number of PWM duty cycles corresponding to desired luminous flux values corresponding to the specific target color set points. The operating temperature $T_0$ of the LEDs 130 may be measured and recorded along with the color coordinate data.

In a step 1020, a desired target color set point $C_T$ and luminous flux $\phi_T$ is input.

In a step 1030, an operating color coordinate $C_1$ and luminous flux $\phi_1$ of each color LED 130 (e.g., RGBW) and associated operating duty cycle $d_1$ is determined when producing essentially the desired target color set point $C_T$. An iterative method, a color shift measurement method, or a direct measurement method may be used, as described below with respect to FIGS. 11, 12, and 13.

In a step 1040, the LED lighting module 110 may be operated for a period of time at the operating conditions $C_1$, $\phi_1$, and $d_1$ to insure an accurate reading corresponding to typical operating conditions in the field, and the resulting operating color coordinates $C_{mT}$ and luminous flux $\phi_{mT}$ are recorded along with the corresponding operating temperature $T_o$.

In a step 1050, a distance between the resulting operating color coordinates $C_{mT}$ and luminous flux $\phi_{mT}$ measured in step 1040 and the operating color coordinate $C_1$ and luminous flux $\phi_1$ determined in step 1030 is computed in terms of ME step size, and a determination is made as to whether the distance is less than a threshold value such as one half ME step. The ME step size refers to the radius of a MacAdam Ellipse centered about either $C_{mT}$ or $C_1$ on the CIE 1931 chromaticity diagram, or in between, corresponding to one standard deviation or 68.25% of the general, color normal population. In other words, $C_{mT}$ and $C_1$ are both within a same one-step MacAdam Ellipse when the distance therebetween is less than an ME step size. At a distance of one ME step size, 68.26% of the general, color normal population would be able to visibly distinguish the colors $C_{mT}$ or $C_1$.

If the distance measured in step 1050 is not less than the threshold value, in a step 1060, flux values $\phi_c$(R, G, B, W) are computed based on the $C_{mT}$ and $\phi_{mT}$ measurements of step 1040 using a color mixing method such as that described with reference to FIG. 9. The difference between $\phi_c$(R, G, B, W) and $\phi_1$(R, G, B, W) is then computed, and $\phi_1$(R, G, B, W) is adjusted accordingly. Thereafter, step 1040 is repeated.

If the distance measured in step 1050 is less than the threshold value, in a step 1070, the operating temperature $T_0$ of the circuit board having the LEDs 130 is measured and recorded along with operating color coordinate $C_1$(R, G, B, W) and luminous flux $\phi_1$(R, G, B, W) as computed in step 1030 or revised in step 1050.

In a step 1080, a determination is made as to whether additional color coordinates $C_1$(R, G, B, W) and luminous flux $\phi_1$(R, G, B, W) need to be computed for other target color points $C_{Tk}$. If so, steps 1020 through 1070 are repeated for each target color point $C_{Tk}$.

Otherwise, in a step 1090, luminous flux entries $\phi_1$(R, G, B, W) for each target point k at other flux levels than target input flux level $\phi_T$ are estimated by computations using predetermined LED flux data curves.

At a step 1095, a validation may be performed to insure that the LED lighting module 110 produces the desired color set points when the LED lighting module 110 is controlled using compensation methods that use the calibration data. It is determined whether the validation passes or fails. The results of the validation are noted, and the method is complete.

Figure 11:
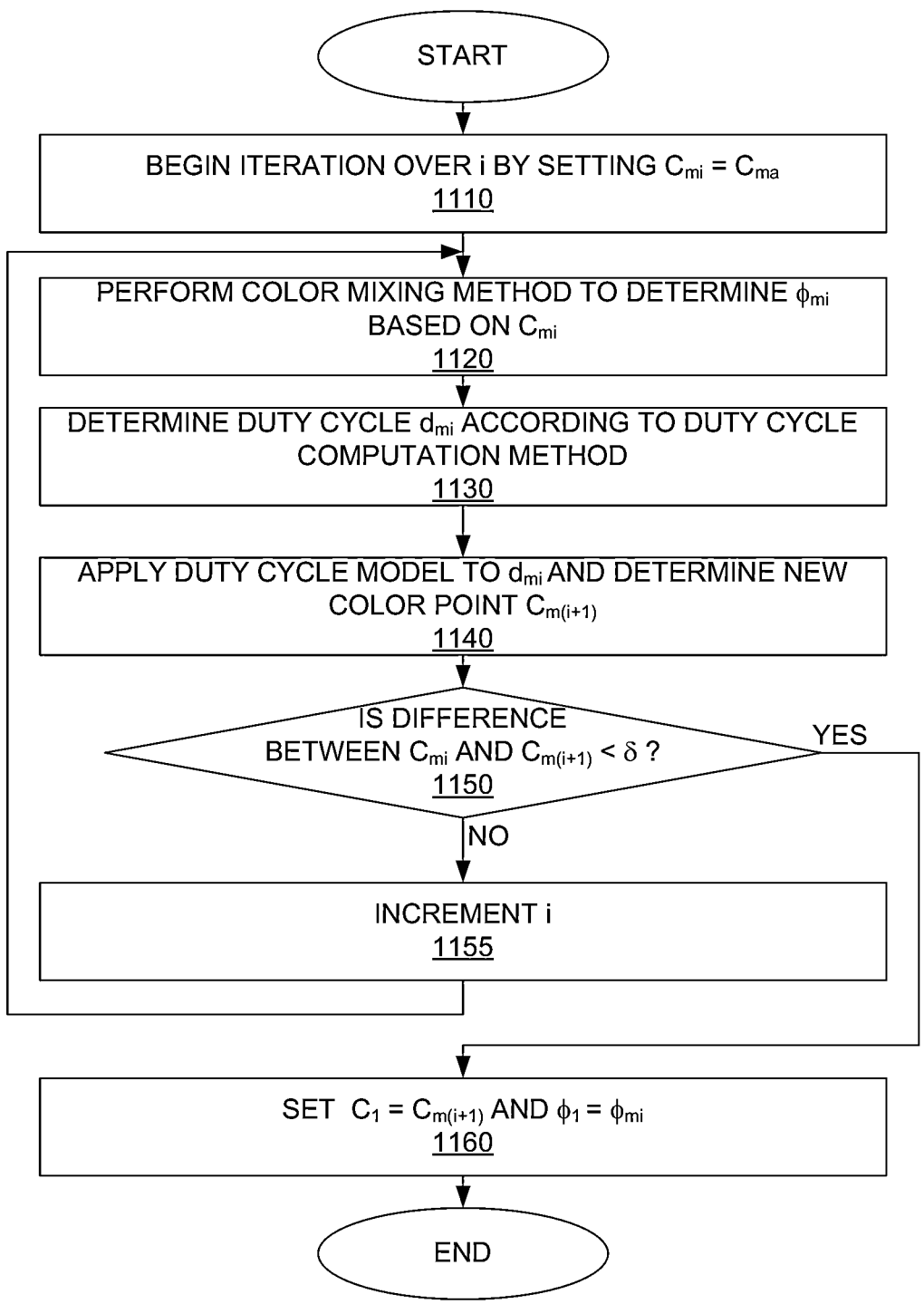
FIG. 11 illustrates an iterative method of obtaining color coordinates and flux of LEDs of an LED lighting module.

FIG. 11 illustrates an iterative method of obtaining color coordinates and flux of LEDs of an LED lighting module. The method illustrated in FIG. 11 may be performed as part of step 1030 of FIG. 10. In practice, chromaticity coordinates and flux levels of an LED are not only functions of duty cycles of the LED itself, but also of duty cycles of adjacent LEDs. This may be caused by heating of the adjacent LEDs, for example. Therefore, at different target color and flux points, a group of LEDs (e.g., RGBW) may exhibit different individual color coordinates. Φ

One way to compensate for the dependence of chromaticity coordinates and flux levels of LEDs on the duty cycles of neighboring LEDs in the calibration of the LEDs for the target points k is to use duty cycle models based in the observation that the chromaticity shift caused by duty cycles of an LED and its adjacent LEDs is linear and predictable. A duty cycle model may be constructed to predict the chromaticity shift of RGBW LEDs at different duty cycles and temperatures. Then, the measurement results of the chromaticity of the LEDs at a duty cycle of 25% combined with the duty cycle model may be used to compute the calibrated primary color coordinates of the RGBW LEDs using the iterative method illustrated in FIG. 11.

A duty cycle model may be constructed by collecting measurement data of the RGBW LEDs at different combinations of duty cycles and collecting the measurement data together in a matrix as shown below:

$$M_{d_r d_g d_b d_w} =$$

$$M_{d_r|d_g|d_b|d_w} + \begin{bmatrix} 0 & x'_{rg} & x'_{rb} & x'_{rw} \\ 0 & y'_{rg} & y'_{rb} & y'_{rw} \\ 0 & \phi'_{rg} & \phi'_{rb} & \phi'_{rw} \end{bmatrix} \cdot d_r + \begin{bmatrix} x'_{gr} & 0 & x'_{gb} & x'_{gw} \\ y'_{gr} & 0 & y'_{gb} & y'_{gw} \\ \phi'_{gr} & 0 & \phi'_{gb} & \phi'_{gw} \end{bmatrix} \cdot d_g + \begin{bmatrix}$$

-continued $$\begin{bmatrix} x'_{br} & x'_{bg} & 0 & x'_{bw} \\ y'_{br} & y'_{bg} & 0 & y'_{bw} \\ \phi'_{br} & \phi'_{bg} & 0 & \phi'_{bw} \end{bmatrix} \cdot d_b + \begin{bmatrix} x'_{wr} & x'_{wg} & x'_{wb} & 0 \\ y'_{wr} & y'_{wg} & y'_{wb} & 0 \\ \phi'_{wr} & \phi'_{wg} & \phi'_{wb} & 0 \end{bmatrix} \cdot d_w;$$

$$M_{d_r|d_g|d_b|d_w} = \begin{bmatrix} x_r & x_g & x_b & x_w \\ y_r & y_g & y_b & y_w \\ \phi_r & \phi_g & \phi_b & \phi_w \end{bmatrix}_{d_r|d_g|d_b|d_w}$$

where $M_{d_r|d_g|d_b|d_w}$ represents an LED data matrix where each of the RGBW LEDS operate at the specified duty cycles separately, and $M_{d_r\ d_g\ d_b\ d_w}$ represents an LED data matrix where each of the RGBW LEDS operate at the specified duty cycles simultaneously. The matrix $M_{d_r|d_g|d_b|d_w}$ may be obtained by the method described with reference to FIG. 10. The matrix $M_{d_r\ d_g\ d_b\ d_w}$ may be obtained by assuming that adjacent die heating effects are linearly related to the duty cycle of a given LED. $x'_{i,j}$, $y'_{i,j}$, and $\phi'_{i,j}$ are determined according to $\delta'_{i,j} = \partial \delta_j / \partial d_i$, where i and j are the LED colors r, g, b, or w, and d is the duty cycle. For example, $x'_{r,g}$ represents the $x_g$ color coordinate shift of the green LED with respect to the duty cycle of the adjacent red LED.

Measurements of the heating effect of LEDs due to the PWM duty cycles of adjacent LEDs are made by blocking the light of an adjacent LED when measuring the light output by a particular LED. The measurement process involves driving a first color LED (e.g., red) using a default duty cycle (e.g., 25%), measuring its chromaticity and flux, then turning on an adjacent LED of another color in a similar manner and allowing the adjacent LED to warm up to operating temperature, and then measuring the chromaticity and flux of the first color LED again without impact of the light of the adjacent LED.

In a step 1110, an iteration over an integer i begins with initially setting a color point $C_{mi}(R, G, B, W) = C_{ma}(R, G, B, W)$ as recorded in step 1010 of FIG. 10. In a step 1120, the color mixing method described with reference to FIG. 9 is performed and a desired luminous flux of each of the color LEDS $\phi_{mi}(R, G, B, W)$ corresponding to the color set point $C_{mi}(R, G, B, W)$ is determined. In a step 1130, a duty cycle of each of the color LEDS $d_{mi}(R, G, B, W)$ is determined according to the duty cycle computation method described elsewhere herein. In a step 1140, the duty cycle model described above is applied to the duty cycle $d_{mi}(R, G, B, W)$ computed in step 1030 and a new color point $C_{m(i+1)}(R, G, B, W)$ is determined. In a step 1150, a determination is made as to whether a difference between color points $C_{mi}(R, G, B, W)$ and $C_{m(i+1)}(R, G, B, W)$ is less than a threshold value, such as 0.0001. If the determination is made that the difference is not less than the threshold value, the integer I is incremented and the method returns to step 1120. If the determination is made that the difference is less than the threshold value, the method proceeds to a step 1160, and the color coordinates and flux are set such that $C_1(R, G, B, W) = C_{m(i+1)}(R, G, B, W)$ and $\phi 1(R, G, B, W) = \phi_{mi}(R, G, B, W)$.

A benefit of the iterative method of FIG. 11 is that calibration is fast. However, the duty cycle model may introduce errors, at least partially due to its assumptions. In addition, the duty cycle model may be complicated and time-consuming to build.

Figure 12:
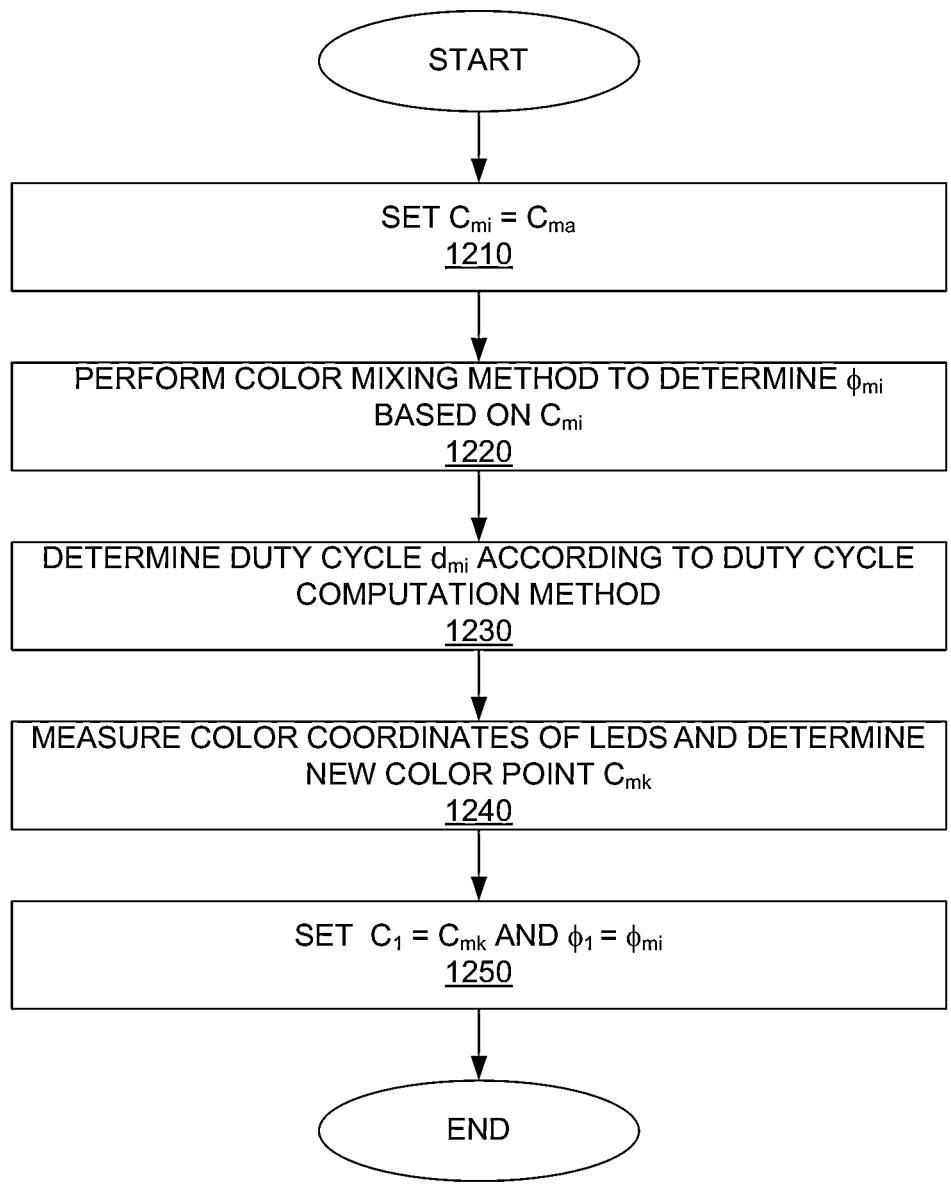
FIG. 12 illustrates a color shift measurement method of obtaining color coordinates and flux of LEDs of an LED lighting module.

FIG. 12 illustrates a color shift measurement method of obtaining color coordinates and flux of LEDs of an LED lighting module 110. The method illustrated in FIG. 12 may be performed as part of step 1030 of FIG. 10. In the method illustrated in FIG. 12, the color shift of the LEDs 130 is measured directly rather than using a duty cycle model as in the method of FIG. 11.

In a step 1210, a color point is initially set as $C_{mi}(R, G, B, W) = C_{ma}(R, G, B, W)$ as recorded in step 1010 of FIG. 10. In a step 1220, the color mixing method described with reference to FIG. 9 is performed and a desired luminous flux of each of the color LEDs 130 $\phi_{mi}(R, G, B, W)$ corresponding to the color set point $C_{mi}(R, G, B, W)$ is determined. In a step 1230, a duty cycle of each of the color LEDs 130 $d_{mi}(R, G, B, W)$ is determined according to the duty cycle computation method described elsewhere herein. In a step 1240, the color coordinates of the color LEDs 130 are measured and a new color point $C_{mk}(R, G, B, W)$ is determined. The color coordinates and flux are then set such that $C_1(R, G, B, W) = C_{mk}(R, G, B, W)$ and $\phi_1(R, G, B, W) = \phi_{mi}(R, G, B, W)$.

A benefit of the color shift measurement method of FIG. 12 is that calibration is fast. In addition, the measurement results may be useful for calibration and compensation of the LEDs 130 and LED lighting modules 110 in other ways. For example, across different LED lighting modules 110, the difference $C_{mk}(R, G, B, W) - C_{ma}(R, G, B, W)$ may be approximately constant. Therefore, by measuring multiple LEDs 130, an average color shift value may be determined for each target of k targets. These average values may then be used to estimate the color coordinates of the LEDs 130 in initial calibration and/or operational compensation.

Figure 13:
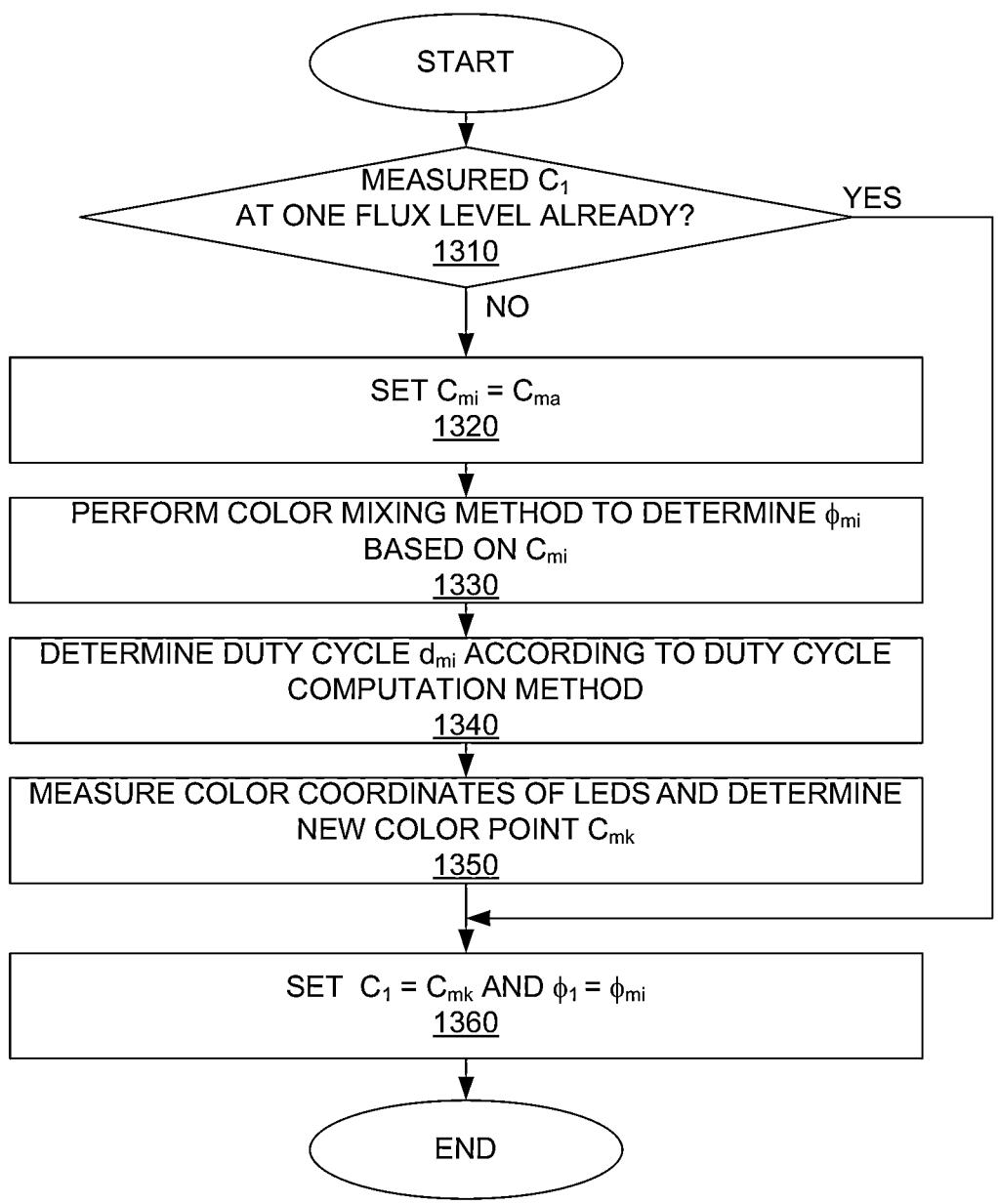
FIG. 13 illustrates a direct measurement method of obtaining color coordinates and flux of LEDs of an LED lighting module.

FIG. 13 illustrates a direct measurement method of obtaining color coordinates and flux of LEDs of an LED lighting module 110. The method illustrated in FIG. 13 may be performed as part of step 1030 of FIG. 10. In the method illustrated in FIG. 13, the color coordinates of the LEDs 130 are measured directly rather than using a duty cycle model as in the method of FIG. 11, and the direct measurement is made only once at each target color point $C_T(R, G, B, W)$ for one flux level. Other flux levels corresponding to other target points of the k target point having the same target color point $C_T(R, G, B, W)$ are then estimated. A benefit of the direct measurement method is that it is simple and accurate, and reduces the amount of calibration measurement data that is collected.

In a step 1310, a determination is made as to whether chromaticity coordinates $C_1(R, G, B, W)$ have been measured to correspond with target $C_T(R, G, B, W)$ already at one flux level already. If a determination is made that measurements have been made already, in a step 1360, the color coordinates and flux are then set such that $C_1(R, G, B, W) = C_{mk}(R, G, B, W)$ as previously measured and $\phi_1(R, G, B, W)$ is estimated based on $\phi_{mi}(R, G, B, W)$ as previously measured according to known flux characteristics of the LEDs. If a determination is made in step 1310 that measurements have not been previously made, in a step 1320, the color point is initially set as $C_{mi}(R, G, B, W) = C_{ma}(R, G, B, W)$ as recorded in step 1010 of FIG. 10. In a step 1330, the color mixing method described with reference to FIG. 9 is performed and a desired luminous flux of each of the color LEDS $\phi_{mi}(R, G, B, W)$ corresponding to the color set point $C_{mi}(R, G, B, W)$ is determined. In a step 1340, a duty cycle of each of the color LEDS $d_{mi}(R, G, B, W)$ is determined according to the duty cycle computation method described elsewhere herein. In a step 1350, the color coordinates of the color LEDs 130 are measured and a new color point $C_{mk}(R, G, B, W)$ is determined. The color coordinates and flux are then set such that $C_1(R, G, B, W) = C_{mk}(R, G, B, W)$ and $\phi 1(R, G, B, W) = \phi_{mi}(R, G, B, W)$.

Temperature Compensation Method

Figure 14:
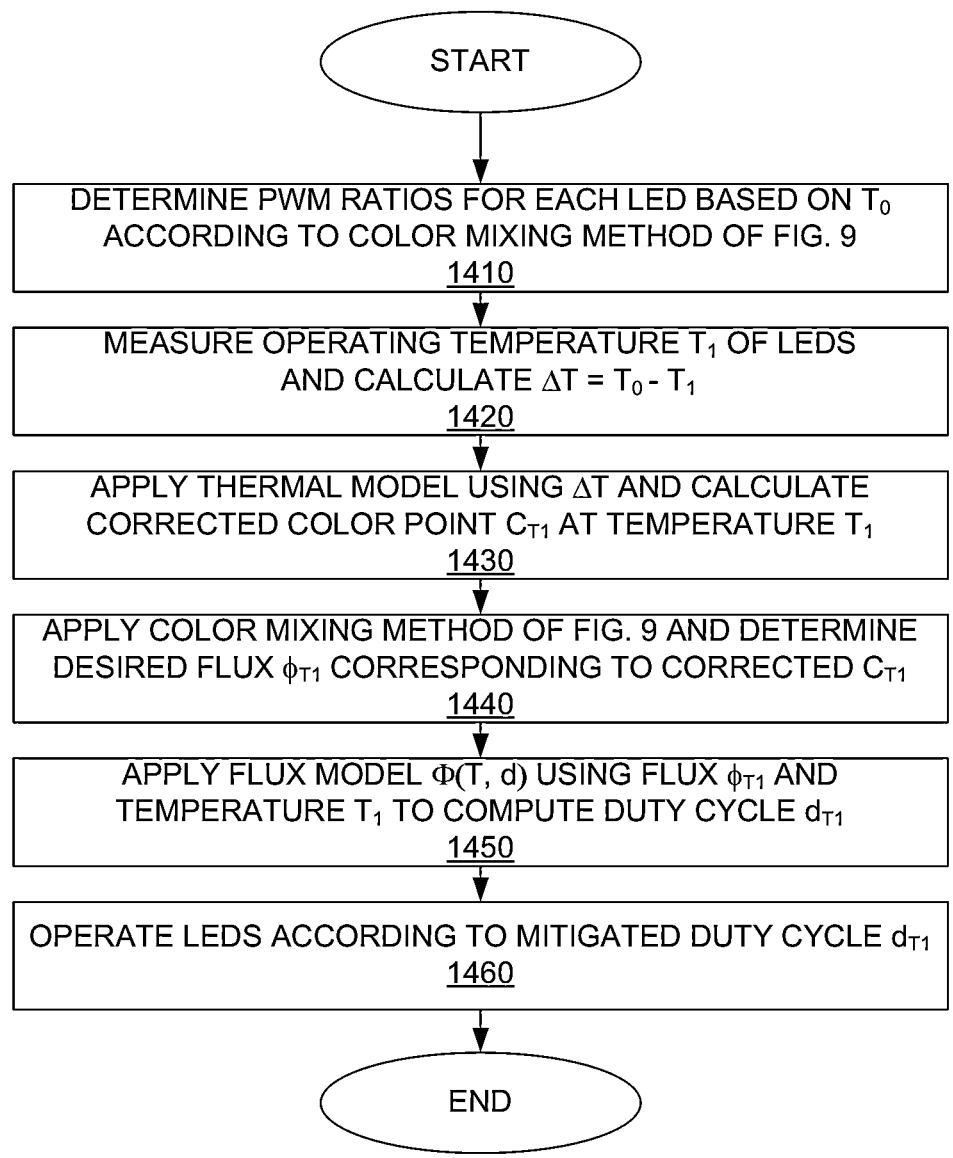
FIG. 14 illustrates a method of adjusting the PWM duty cycle ratios for the LEDs to compensate for temperature variations.

FIG. 14 illustrates a method of adjusting the PWM duty cycle ratios for the LEDs 130 during in-field operation of the LED lighting module 110 to compensate for temperature variations. The method may be performed by the module group controller 90 of the lighting module group 60. In the method, the temperature of each LED 130 measured during initial calibration is compared with the operating temperature of the LED 130, and adjustments to the PWM duty cycle ratio of the LED are made to compensate for the temperature difference according to previously measured and stored temperature calibration data when a temperature change greater than a threshold value is measured. In other words, the method may only be performed when the temperature change above the threshold has been detected. The method includes a thermal model that computes the matrix $M_k(T_1)$ based on the calibrated matrix $M_k(T_0)$ and the temperature difference $\Delta T$ between the measured operational temperature $T_1$ of the LEDS 130 and the temperature $T_o$ measured when the LEDS 130 were calibrated. An equation representing the computations follows:

$$M_k(T_1) = M_k(T_0) + \alpha_{4\times 4} \cdot (T_1 - T_0) + \beta_{4\times 4} \cdot (T_1 - T_0)^2$$

$$= \begin{bmatrix} x_r & x_g & x_b & x_w \\ y_r & y_g & y_b & y_w \\ \phi_r & \phi_g & \phi_b & \phi_w \\ d_r & d_g & d_b & d_w \end{bmatrix}_{T_0} + \begin{bmatrix} \alpha_{xr} & \alpha_{xg} & \alpha_{xb} & \alpha_{xw} \\ \alpha_{yr} & \alpha_{yg} & \alpha_{yb} & \alpha_{yw} \\ \alpha_{\phi r} & \alpha_{\phi g} & \alpha_{\phi b} & \alpha_{\phi w} \\ 0 & 0 & 0 & 0 \end{bmatrix} \cdot$$

$$(T_1 - T_0) + \beta_{4\times 4} \cdot (T_1 - T_0)^2$$

where $\alpha_{4\times 4}$ is the first order thermal parameter matrix in which $\alpha_{xr}$ represents the first order thermal parameter of the CIE 1931 $C_x$ color coordinate of the red LED ($dC_x/dT$), each of the other $\alpha_{??}$ parameters of the $\alpha_{4\times 4}$ matrix correspond to the other derivatives of the respective $C_x$ and $C_y$ color coordinates and $\phi$ parameters of the red, green, blue, and white color LEDs 130 with respect to temperature T at the target color point k; and $\beta_{4\times 4}$ is the second order thermal parameter matrix (e.g., $d^2C_x/dT^2$), which is defined similarly to the $\alpha_{4\times 4}$ matrix. Many elements of the $\beta_{4\times 4}$ matrix will be equal to zero if the desired parameter (e.g., $C_x$, $C_y$, $\phi$) of the LEDs 130 has a linear relationship with respect to temperature T.

In a step 1410, the PWM ratios for each LED 130 are determined according to the method of FIG. 9 based on the temperature $T_o$ measured at the time the calibration measurements of the LED were made.

In a step 1420, the current real-time operating temperature of the LED is measured, and the difference $\Delta T$ between the current temperature $T_1$ and $T_o$ is calculated.

In a step 1430, a thermal model is applied using the measured $\Delta T$ of step 1420 to calculate corrected color point $C_{T1}(R, G, B, W)$ at the current temperature $T_1$. In other words, a new matrix $M_k(T_1)$ as defined above is built and applied. The corrected color point $C_{T1}(R, G, B, W)$ may be computed using the equations $x_{T1}(R, G, B, W)=M_k(T_1)\cdot[1\ 0\ 0\ 0]^T$ and $y_{T1}(R, G, B, W)=M_k(T_1)\cdot[0\ 1\ 0\ 0]^T$.

In a step 1440, the color mixing method described with reference to FIG. 9 is performed and a desired luminous flux of each of the color LEDS $\phi_{T1}(R, G, B, W)$ corresponding to the temperature-corrected color set point $C_{T1}(R, G, B, W)$ is determined.

In a step 1450, a flux model $\Phi(T, d)$ is applied using the flux $\phi_{T1}(R, G, B, W)$ and the temperature $T_1$ to compute the mitigated duty cycle $d_{T1}(R, G, B, W)$. The flux model $\Phi(T, d)$ is a function of temperature T and duty cycle d. The adjustment of the duty cycle for temperature $T_1$ $\Delta d_{T1}$ can be calculated from the duty cycle $d_{T1}$ after temperature correction as follows: $\Delta d_{T1}=d_{T1}-M_k(T_1)\cdot[0\ 0\ 0\ 0]^T$.

In the flux model $\Phi(T, d)$, the PWM duty cycles $d_{kT}$ for each color target point k and each LED 130 are computed at four characteristic points: minimum, nominal, and maximum operating temperatures, and the temperature at which the color target point k moves from one color mixing zone to another color mixing zone. A trend line between the temperature points within a zone is approximated using a second order polynomial, and then used to approximate the $\Delta d_{T1}$ for the measured operational temperature $T_1$. The following equations describe the computation of a duty cycle d on the trend line when the operating temperature $T_1$ lies on an opposite side of the color mixing zone switching temperature $T_{sw}$ compared to the calibration measurement temperature $T_0$ (for $T<T_{sw}$ and $T_0 \geq T_{sw}$):

$$d(T) = d(T_{sw}) + \alpha \cdot (T - T_{sw}) + \beta(T - T_{sw})^2$$

$$\alpha = \frac{A - \beta \cdot C}{B}$$

$$\beta = \frac{B \cdot D - A \cdot E}{B \cdot F - C \cdot E}$$

$$A = \alpha B + \beta C$$

$$D = \alpha E + \beta F$$

$$A = y(t_1) - y_0$$

$$B = t_1 - t_0$$

$$C = (t_1 - t_0)^2$$

$$D = y(t_2) - y_0$$

$$E = t_2 - t_0$$

$$F = (t_2 - t_0)^2$$

The polynomial $\alpha$ and $\beta$ values may be computed in advance and stored along with the calibration data for each color LED 130 (R, G, B, W) at each target color point $C_k$(R, G, B, W) and luminous flux $\phi_k$(R, G, B, W), as well as the measured temperature value $T_0$ that corresponds to each target color point $C_k$(R, G, B, W) and luminous flux $\phi_k$(R, G, B, W).

An alternative flux model $\Phi(T, d)$ may be built from separate calibration measurements of the flux value for each LED 130 of the colors R, G, B, W as a function of duty cycles and temperature. The measurements may be used to determine whether $\Phi(T)$ and $\Phi(d)$ are independent of one another in order to determine the appropriate way to predict LED performance and determine appropriate duty cycles over temperature to achieve desired flux levels.

In a step 1460, the LEDs 130 of the LED light module 110 are operated according to the mitigated duty cycle $d_{T1}$(R, G, B, W). If the computed duty cycle is less than zero or greater than 100%, it is set to zero or 100%, respectively, as appropriate. In addition, the duty cycle may be limited to a value less than 100%, depending on the application. For example, a lower duty cycle value may lengthen the life of the LEDS 130. In this case, the duty cycle for all color points may be scaled by a factor such that they lie within the allowed range of the duty cycles. For example, if the duty cycle without applying an upper limit is 100%, and the upper limit is 80%, then the scaled duty cycle would be 80%. Likewise, a 50% duty cycle would scale to 40%. The scaling factor would be applied to each duty cycle for each color LED 130 (RGBW).

Because the color coordinates of each of the LEDs 130 change as a function of temperature, the color mixing zones also shift in correspondence thereto on the CIE chromaticity diagram. Thus, a target color point k which was on or near a border between two color mixing zones may shift between one color mixing zone and another color mixing zone due to the temperature changes. During operation of the LED lighting modules 110, this is accounted for because the mixing ratio and duty cycles of the RGBW LEDs 130 are calculated dynamically according to measured temperature variations. However, these shifts should be accounted for in the calibration process for the LEDs 130. In particular, it is important for the color coordinates to be stored in the calibration data even if the flux φ and duty ratio d corresponding to the color coordinate are zero.

Age Compensation Method

Over the lifetime of each LED 130, luminous flux varies. An adjustment factor may be applied during operation of the LEDs 130 using piecewise linear approximation of a lifetime luminous flux variation curve. The lifetime flux variation may be a characteristic of each type of LED 130 used, and may not need to be calibrated separately along with the target color point $C_k(R, G, B, W)$ and luminous flux $\phi_k(R, G, B, W)$ of the LEDs 130.

Additional Exemplary Embodiment

The following describes an additional exemplary embodiment and communications for an implementation of the system. The ACP is the main interface point for cabin attendants and maintenance personnel, and it allows input from users to execute the various cabin lighting scenarios inside the aircraft cabin as well as configure address and view BIT information from its LCD touch screen interface.

In this embodiment, all lighting LRUs maintain their scene information locally in the LRU. The ACP is responsible for commanding the lighting system to the specific scene that has been selected by the cabin crew. Lighting assemblies have the capability to receive messages from the ACP via RS485. The lighting assemblies are individually addressable enabling the ACP to individually communicate with each lighting assembly, or to communicate with a group of lighting assemblies. Lighting assemblies also have the capability of being BIT tested to detect if the assembly is still communicating with the system. BIT information from the lighting system can then be viewed on the ACP.

In this embodiment, the lighting LRUs have the capability to have sixteen pre-programmed scenes and sixteen re-programmable scenes. The pre-programmed scenes do not have the ability to be altered. The reprogrammable scenes can be altered onboard the aircraft by the ACP without the need to re-work the devices on a bench. The lighting scenarios are static, and transition at a variable rate do not to exceed 5 minutes from one scene to another. In this embodiment, the physical layer requirements are as follows:

Communication Method: RS485 Multi-drop Bus (2-wire+shield)
RS485 Signals: RS485A, RS485B and RS485 Shield
RS485 Transceivers Load: ⅛ Load, Max possible LRUs=255 (Physical Limit)
Baud Rate: 115200 bps
Baud Rate Tolerance: ±185 bps
Duplex: Half-Duplex
Token Signals: Token-In, Token-Out and Token-Ref Token Electrical Characteristics:

| | DC Characteristics | | MIN | MAX | UNIT |
|---|---|---|---|---|---|
| Token-In | $V_{IH}$ | High-Level Input Voltage | 4 | 5 | V |
| | $V_{IL}$ | Low-Level Input Voltage | GND | 0.5 | V |
| Token-Out | $V_{OH}$ | High-Level Output Voltage | 4 | 5 | V |
| | $V_{OL}$ | Low-Level Output Voltage | GND | 0.5 | V |

ACP Protocol Requirements

The ACP is the controlling focus of the lighting system. The protocol requirements are the timing and transmission guidelines the ACP in an embodiment of the invention follow for the lighting system to operate correctly.

1) Each scene change initiated at the ACP results in a notification message being broadcast to the lighting system. This message is repeated 3 times, with each message spaced 50 ms apart.

2) The ACP ensures that each consecutive message sent to the lighting system is no less than 50 ms apart.

3) The ACP periodically re-broadcasts the current scene selection at intervals of 10 seconds.

4) All responses to the ACP from the lighting LRUs occur within 50 ms.

5) The checksum calculation begins and include the <SOT> byte and continues until <ASCII XOR XSUM> bytes.

6) Any message with an unknown <CMD> are discarded.

7) Any message with fields containing illegal or unused values for the specific <CMD> should be discarded.

8) When an LRU has its Input Token Signal active, all messages besides an Address Assignment Message should be discarded.

Each lighting LRU in this embodiment incorporates an individual and unique address. This address helps to identify the location of the lighting LRU in the aircraft. Using a lighting LOPA, an individual could determine the exact position of the light in the aircraft. The SCENE SELECTION message allows the ACP to select a lighting scene for a specific LRU, a Zone of Lights or the entire aircraft. The scene selection message allows the ACP to select either preloaded aircraft lighting scenes or customer specific lighting scenes.

Scene Selection

Specifications

Source Device: ACP

Destination Device Lighting LRUs

1) The lighting assemblies ignore any scene selection messages that select a scene that is not programmed.

2) Upon system power up, each LRU should wait for 30 seconds to receive a Scene Selection Message. If none is received within that time period, the LRU will automatically transition to 100% White light.

3) Receipt of a Scene Selection Message should cancel/terminate any BIT/BITE mode that may be in progress.

4) The lighting assemblies should ignore this message while downloading scenes, or addressing is taking place.

Protocol—Scene Selection Message

| Command Format | <SOT> | <DEST MODE> | <DEST> | <CMD> | <DATA> | <XOR CHECKSUM> | <EOT> |
|---|---|---|---|---|---|---|---|
| Bytes | 1 | 1 | 1 | 1 | 2 | 2 | 1 |
| Data | 0x01 | 0x30-0x32 | 0x20-0xFF | 0x20 | DATA | ASCII XOR XSUM | 0x04 |

CMD Set Description
<SOT>=0x01—Start of Transmission Character
<EOT>=0x04—End of Transmission Character
<DEST MODE>=[0x30-0x32]—The destination mode selection byte
　0x30=Broadcast Message
　0x31=Group/Zone Message
　0x32=Address Message
<DEST>=[0x20-0xFF]—The Destination Address.
<DEST MODE>=0x30:
<DEST>=[0x30]—Don't Care
<DEST MODE>=0x31:
<DEST>=[0x31-0xFF]—The zone selection
<DEST MODE>=0x32:
<DEST>=[0x21-0xFF] 0x20 offset+address, MAX possible LRUs=222
<CMD>=0x20
<DATA>=2 Bytes <SCENE><INTENSITY>
<SCENE>=Scene Selection byte. Denotes LRU stored scene information. The ACP can select either standard aircraft scenes or customer specific scenes by altering the first nibble of this byte.

Standard Scenes: 0x30 offset+4 bit scene number. 16 scenes max
Customer Specific Scenes: 0xC0 offset+4 bit scene number. 16 scenes max.
<INTENSITY>[0x31-0x34]—Denotes the relative intensity setting for the scene selected.
　0x31=HIGH
　0x32=MED
　0x33=LOW
　0x34=NIGHT
Addressing Operation:
The ACP controls addressing of the washlights. The ACP can use the Token Line in addition to the RS485 line to help address the washlights. In this embodiment, each washlight LRU has an RS485 transceiver, Token-In and Token-Out Lines.

The token lines are used to identify, which washlight is currently being addressed. If a washlight's Token-In line is active, then the washlight is currently being addressed and any Address Assignment Messages are intended solely for that LRU. If the washlight receives the address input message it will acknowledge the receipt of an address with an Address Response Message. This signifies that addressing is complete for the LRU and it is time to move on to the next LRU.

Next, the ACP can pass the token by sending a Pass Token Command which will allow the next washlight in the column to be addressed. Once this is received, the currently addressed washlight will set its Token-Out line active so that the next sequential washlight can be addressed. In conjunction, the previous addressed LRU should set its Token-Out line inactive to complete addressing operations for the currently addressed LRU.

Protocol—Address Assignment Message
Specifications
Source Device: ACP
Destination Device: Lighting LRUs 1) Addressing messages are only processed by lighting assemblies whose Token-In line is active.
2) ACP asserts its Token-Out line active before it begins sending the first address assignment message.
3) The lighting assemblies are reassigned any time an LRU is replaced on board the aircraft.
4) The Token Lines are considered active when these signals have the voltage potential of the Token Ref Line (GND).

Protocol:

| Command Format | <SOT> | <DEST MODE> | <DEST> | <CMD> | <DATA> | <XOR CHECKSUM> | <EOT> |
|---|---|---|---|---|---|---|---|
| Bytes | 1 | 1 | 1 | 1 | 2 | 2 | 1 |
| Data | 0x01 | 0x30-0x32 | 0x20-0xFF | CMD | DATA | ASCII XOR XSUM | 0x04 |

CMD Set Description
<SOT>=[0x01]—Start of Transmission Character
<EOT>=[0x04]—End of Transmission Character
Address Assignment Message:
<DEST MODE>=[0x30]—The destination mode selection byte
　0x30=Broadcast Message
<DEST>=[0x30]—The Destination Address.
<DEST MODE>=0x30:
<DEST>=[0x30]—Don't Care
<CMD>=[0x10]—This command sets the washlights address.
<DATA>=<Address><Group/Zone>
<Address>=[0x21-0xFF] 0x20 offset+address, MAX possible LRUs=222
<Group/Zone>=[0x30-0xFF]—Group/Zone Assignment
Protocol—Address Response Message
Specifications
Source Device: Addressed Lighting LRU
Destination Device: ACP
1) The ACP should exit "Addressing Mode" after sending an Address Assignment Message without receiving an Address Response Message within 50 ms.
2) The ACP should compare the information returned in the Address Response Message to its internal database, in order to ascertain that the correct light type is at the address in question. It may also verify the serial number, hardware version number, and firmware version number. Any discrepancy in returned information should stop the addressing mode of the ACP, and alert the operator to the problem.

Protocol:

| Command Format | <ACK SOT> | <CMD> | <DATA> | <XOR CHECKSUM> | <EOT> |
|---|---|---|---|---|---|
| Bytes | 1 | 1 | 62 | 2 | 1 |
| Data | 0x06 | CMD | DATA | ASCII XOR XSUM | 0x04 |

CMD Set Description
<ACK SOT>=[0x06]—Start of Transmission Character
<EOT>=[0x04]—End of Transmission Character
Address Response Message:
<CMD>=[0x1F]—This command is the acknowledgement message from the washlight.
<DATA>=<Address><Device ID><Serial #><Hardware Rev><Firmware Rev>
<Address>=[0x21-0xFF]—The newly assigned address of the LRU
0x20 offset+address value, MAX possible LRUs=222
<Device ID>=[0x41-0x43]—The LRU type.
[0x41]=9100 Direct Lights (W+A)
[0x42]=9150 Cross-Bin Wash Lights (W+A)
[0x42]=9150 COS Wash Light (W+A)
[0x43]=9200 Ceiling Wash Lights (RGB+W)
[0x43]=9200 Sidewall Wash Lights (RGB+W)
[0x43]=9200 Cove Wash Light (RGB+W)
[0x43]=9250 Over-Wing Exit Wash Lights (RGB+WW)<
<Serial #>=20 ASCII bytes denoting LRU Serial Number (Stored in LRU non-volatile memory)<
<Hardware Rev>=20 ASCII bytes denoting LRU Hardware Rev (Stored in LRU non-volatile memory)<
<Firmware Rev>=20 ASCII bytes denoting LRU Firmware Rev Number (Stored in LRU non-volatile memory)
Protocol—Pass Token Command
Specifications
Source Device: ACP
Destination Device Lighting LRUs
<Addressing Complete>=0x31 when the last washlight is being addressed.
Protocol:

| Command Format | <SOT> | <DEST MODE> | <DEST> | <CMD> | <DATA> | <XOR CHECKSUM> | <EOT> |
|---|---|---|---|---|---|---|---|
| Bytes | 1 | 1 | 1 | 1 | 1 | 2 | 1 |
| Data | 0x01 | 0x30-0x32 | 0x20-0xFF | CMD | DATA | ASCII XOR XSUM | 0x04 |

CMD Set Description
<SOT>=[0x01]—Start of Transmission Character
<EOT>=[0x04]—End of Transmission Character
Pass Token Command:
<DEST MODE>=[0x32]—The destination mode selection byte
0x32=Address Message
<DEST>=[0x20-0xFF]—The Destination Address.
<DEST MODE>=0x32:
<DEST>=[0x21-0xFF] 0x20 offset+address, MAX possible LRUs=222
<CMD>=[0x11]—This command tells the washlights to pass the token <DATA>=<Addressing Complete>
<Addressing Complete>=1 byte indicating that addressing is complete
[0x30]=Addressing is not complete
[0x31]=Addressing is complete.
Example Message Format ACP sends:
Byte 1: 0x01
Byte 2: 0x10
Byte 3: 0x21
Byte 4: 0x33
Byte 5: 0x35
Byte 6: 0x36
Byte 7: 0x04

Washlight Responds:
Byte 1: 0x01
Byte 2: 0x1F
Byte 3: 0x21
Byte 4: 0x41
Byte 5-24: 0x30, 0x30, 0x30, 0x30, 0x30, 0x30, 0x30, 0x30, 0x30, 0x30,
0x30, 0x30, 0x30, 0x30, 0x30, 0x30, 0x30,
0x30, 0x30, 0x30
Byte 25-44: 0x30, 0x30, 0x30, 0x30, 0x30, 0x30, 0x30, 0x30, 0x30, 0x30,
0x30, 0x30, 0x30, 0x30, 0x30, 0x30, 0x30,
0x30, 0x30, 0x30
Byte 45-64: 0x30, 0x30, 0x30, 0x30, 0x30, 0x30, 0x30, 0x30, 0x30, 0x30,
0x30, 0x30, 0x30, 0x30, 0x30, 0x30, 0x30,
0x30, 0x30, 0x30
Byte 65: 0x32
Byte 66: 0x42
Byte 67: 0x04

ACP sends Pass Token Command:
Byte 1: 0x01
Byte 2: 0x11
Byte 3: 0x30
Byte 4: 0x30
Byte 5: 0x34
Byte 6: 0x35
Byte 7: 0x04

Bit Bite Operation

The ACP can control when BIT/BITE is initiated. The ACP can use, e.g., the RS485 line to poll each washlight in the system to determine if the washlight is still active. In addition to polling each LRU, when a washlight receives a BIT request, this sets the light intensity and colors to a specific level which provide visual lamp test functionality. All BIT/BITE requests should be processed and acknowledged from the lighting LRUs within 50 ms.

Protocol—Bit/Bite Request Message

Specifications

Source Device: ACP

Destination Device Lighting LRUs

1) Receipt of a Scene Selection Message cancels/terminates any BIT/BITE mode that may be in progress.
2) The lighting assemblies ignore BIT/BITE messages while downloading scenes, or addressing is taking place.

3) The ACP polls each LRU by setting the <DEST MODE>=0x32 and <DEST> to the destination address of the lighting LRU currently being polled.
Protocol

| Command Format | <SOT> | <DEST MODE> | <DEST> | <CMD> | <XOR CHECKSUM> | <EOT> |
|---|---|---|---|---|---|---|
| Bytes | 1 | 1 | 1 | 1 | 2 | 1 |
| Data | 0x01 | 0x30-0x32 | 0x20-0xFF | 0x30 | ASCII XOR XSUM | 0x04 |

CMD Set Description

<SOT>=0x01—Start of Transmission Character

<EOT>=0x04—End of Transmission Character

<DEST MODE>=[0x30-0x32]—The destination mode selection byte

0x30=Broadcast Message

0x31=Group/Zone Message

0x32=Address Message

<DEST>=[0x30-0xFF]—The Destination Address.

<DEST MODE>=0x30:

<DEST>=[0x30]—Don't Care

<DEST MODE>=0x31:

<DEST>=[0x31-0xFF]—The zone selection

<DEST MODE>=0x32:

<DEST>=[0x21-0xFF] 0x20 offset+address value, MAX possible LRUs=222

<CMD>=0x30

Protocol—Bit/Bite ACK Message

Specifications

Source Device: Addressed Lighting LRU

Destination Device: ACP

1) If the <DEST MODE>=0x32 of the BIT/BITE Request message, the LRU responds with the BIT/BITE ACK message immediately upon receipt of the BIT/BITE Request message, if the <DEST> of the request matches the address of the lighting assembly.

2) The ACP should receive a BIT/BIT ACK message within 50 ms of sending the BIT/BITE request message.

3) If the <DEST MODE>=0x30 of the BIT/BITE Request message, the lighting assemblies each respond with the BIT/BITE ACK message after delaying for an interval of 50 milliseconds. Note that the LRU address can be used as a seed value to determine the length of time each LRU will wait before transmitting its BIT/BITE ACK message.

4) If the <DEST MODE>=0x31 of the BIT/BITE Request message, the lighting assemblies each respond with the BIT/BITE ACK message after delaying for an interval of 50 milliseconds. Note that the LRU address can be used as a seed value to determine the length of time each LRU will wait before transmitting its BIT/BITE ACK message.

5) The ACP should compare the information returned in the BIT/BITE ACK Message to its internal database, in order to ascertain that the information in the lighting assembly is correct. Any discrepancy in returned information should alert the operator to the problem.
Protocol:

| Command Format | <ACK SOT> | <CMD> | <DATA> | <XOR CHECKSUM> | <EOT> |
|---|---|---|---|---|---|
| Bytes | 1 | 1 | 103 | 2 | 1 |
| Data | 0x06 | CMD | DATA | ASCII XOR XSUM | 0x04 |

CMD Set Description

<ACK SOT>=[0x06]—Start of Transmission Character for ACK messages

<EOT>=[0x04]—End of Transmission Character
Address Response Message:

<CMD>=[0x3F]—This command is the acknowledgement message from the washlight.

<DATA>=<Address><Device ID><Serial #><Hardware Rev><Firmware Rev>

<B Scene Rev><User Scene Rev><Cal Flag>

<Address>=[0x21-0xFF]—The newly assigned address of the LRU

0x20 offset+address value, MAX possible LRUs=222

<Device ID>=[0x41-0x43]—The LRU type.
[0x41]=9100 Direct Lights (W+A)
[0x42]=9150 Cross-Bin Wash Lights (W+A)
[0x42]=9150 COS Wash Light (W+A)
[0x43]=9200 Ceiling Wash Lights (RGB+W)
[0x43]=9200 Sidewall Wash Lights (RGB+W)
[0x43]=9200 Cove Wash Light (RGB+W)
[0x43]=9250 Over-Wing Exit Wash Lights (RGB+WW)<

Serial #>=20 ASCII bytes denoting LRU Serial Number (Stored in LRU non-volatile memory)

<Hardware Rev>=20 ASCII bytes denoting LRU Hardware Rev (Stored in LRU non-volatile memory)<

<Firmware Rev>=20 ASCII bytes denoting LRU Firmware Rev Number (Stored in LRU non-volatile memory)<

<B Scene Rev>=20 ASCII bytes denoting LRU aircraft Scenes P/N and Rev Number (Stored in LRU non-volatile memory)<

<User Scene Rev>=20 ASCII bytes denoting LRU User Scenes P/N and Rev Number (Stored in LRU non-volatile memory)<

<Cal Flag>=1 byte indicating that the washlight is calibrated
0x30=Washlight is not calibrated
0x31=Washlight is calibrated Scene Download Operation The Scene Download operation is used to update the locally stored scenes on the lighting LRUs. The ACP controls when the Scene Download Operation is initiated. The ACP can use the RS485 line to help store the scene information into each washlight in the system. The ACP first sends a SCENE DOWNLOAD REQUEST message to all washlights in the system. This instructs the washlights to allow protected EEPROM space to be altered. The ACP can then transmit the SCENE CONTENT message for each scene. The scene content message contains the scenes information one scene at a time.

Once all the new scenes have been transmitted, the ACP can poll each washlight with a SCENE QUERY REQUEST message. The Scene query message can ask the washlight if it has received all the scenes. The washlight replies with a SCENE QUERY REPLY message notifying the ACP it has received/not received all the information. If the washlight has received the information, it should commit all the scene information to non-volatile EEPROM. If the washlight responds that it has not received all the information, the ACP should retransmit the SCENE CONTENT message again to all the washlights and resume re-querying the washlights.

All SCENE QUERY REQUEST messages should be processed and acknowledged by the Lighting LRUs within 50 ms.

Protocol—SCENE DOWNLOAD REQUEST Specifications
Source Device: ACP
Destination Device Lighting LRUs
1) The lighting assemblies should ignore BIT/BITE messages while downloading scenes, or addressing is taking place.
2) All other scene download commands should be ignored unless the scene download request is transmitted.
3) The scene download request may be a broadcast message. Every lighting LRU receives this message.
Protocol <Total Scenes Num>=[0x31-0x40]—The total number of scenes to be updated from 1 (0x31) to 16 (0x40).
<Empty>=0x30
Protocol—Scene Content Message Specifications
Source Device: ACP
Destination Device: Lighting LRUs
The scene content message may be a broadcast message. Every lighting LRU should receive this message.
Protocol

| Command Format | <SOT> | <DEST MODE> | <DEST> | <CMD> | <DATA> | <XOR CHECKSUM> | <EOT> |
|---|---|---|---|---|---|---|---|
| Bytes | 1 | 1 | 1 | 1 | 16 | 2 | 1 |
| Data | 0x01 | 0x30-0x32 | 0x20-0xFF | CMD | DATA | ASCII XOR XSUM | 0x04 |

CMD Set Description
<SOT>=0x01—Start of Transmission Character
<EOT>=0x04—End of Transmission Character
<DEST MODE>=[0x30]—The destination mode selection byte
0x30=Broadcast Message
<DEST>=[0x30]—The Destination Address.
<DEST MODE>=0x30:
<DEST>=[0x30]—Don't Care
<CMD>=0x51
<DATA>=S1,R1,R2,G1,G2,B1,B2,W1,W2,E1,E2,A1,A2,T1,T2

| Command Format | <SOT> | <DEST MODE> | <DEST> | <CMD> | <DATA> | <XOR CHECKSUM> | <EOT> |
|---|---|---|---|---|---|---|---|
| Bytes | 1 | 1 | 1 | 1 | 22 | 2 | 1 |
| Data | 0x01 | 0x30-0x32 | 0x20-0xFF | CMD | DATA | ASCII XOR XSUM | 0x04 |

CMD Set Description
<SOT>=0x01—Start of Transmission Character
<EOT>=0x04—End of Transmission Character
<DEST MODE>=[0x30]—The destination mode selection byte
0x30=Broadcast Message
<DEST>=[0x30]—The Destination Address.
<DEST MODE>=0x30:
<DEST>=[0x30]—Don't Care
<CMD>=0x50
<DATA>=<User Scene Rev><Total Scenes Num><Empty>
<User Scene Rev>=20 ASCII bytes denoting LRU User Scenes P/N and Rev Number (Stored in LRU non-volatile memory)<

S1=[0x31-45]—Scene Selection byte. Denotes LRU stored scene information
0x30 offset+4 bit scene number. 16 scenes max.
Rx—The Red intensity value is 12 bits wide and split into 2 bytes, R1 and R2.
R1=0x40 offset+Most Significant 6 of 12 bits (RED)
R2=0x40 offset+Least Significant 6 of 12 bits (RED)
Gx—The Green intensity value is 12 bits wide and split into 2 bytes, G1 and G2. G1=0x40 offset+Most Significant 6 of 12 bits (GREEN)
G2=0x40 offset+Least Significant 6 of 12 bits (GREEN)
Bx=The Blue intensity value is 12 bits wide and split into 2 bytes, B1 and B2.
B1=0x40 offset+Most Significant 6 of 12 bits (BLUE)
B2=0x40 offset+Least Significant 6 of 12 bits (BLUE)

Wx=The White intensity value (RGB+W Washlights) is 12 bits wide and split into 2 bytes, W1 and W2

W1=0x40 offset+Most Significant 6 of 12 bits (WHITE)

W2=0x40 offset+Least Significant 6 of 12 bits (WHITE)

Ex=The White intensity value (W+A Washlights) is 12 bits wide and split into 2 bytes, E1 and E2

E1=0x40 offset+Most Significant 6 of 12 bits (WHITE)

E2=0x40 offset+Least Significant 6 of 12 bits (WHITE)

Ax=The Amber intensity value is 12 bits wide and split into 2 bytes, A1 and A2

A1=0x40 offset+Most Significant 6 of 12 bits (AMBER)

A2=0x40 offset+Least Significant 6 of 12 bits (AMBER)

Tx—The scene transition time represents the number of seconds the scene will be transitioning. It is a 12 bit wide value and split into 2 bytes, T1 and T2.

T1=0x40 offset+Most Significant 6 of 12 bits

T2=0x40 offset+Least Significant 6 of 12 bits

Protocol—Scene Query Request

Specifications

Source Device: ACP

Destination Device: Lighting LRUs

1) After receiving the Scene Query Request message, lighting assemblies may resume normal operation
2) The ACP can poll each LRU by setting the <DEST MODE>=0x32 and <DEST> to the destination address of the lighting LRU currently being polled.
3) Each lighting LRU should be queried.

Protocol

3) The ACP should compare the information returned in the Scene Query Reply Message to its internal database, in order to ascertain that the correct information is stored in the lighting assembly. Any discrepancy in returned information should alert the operator to the problem.

Protocol:

| Command Format | <ACK SOT> | <CMD> | <DATA> | <XOR CHECKSUM> | <EOT> |
|---|---|---|---|---|---|
| Bytes | 1 | 1 | 41 | 2 | 1 |
| Data | 0x06 | CMD | DATA | ASCII XOR XSUM | 0x04 |

CMD Set Description

<ACK SOT>=[0x06]—Start of Transmission Character for Ack messages.

<EOT>=[0x04]—End of Transmission Character

Scene Query Reply Message:

<CMD>=[0x5F]—This command is the acknowledgement message from the washlight.

<DATA>=<Address><B Scene Rev><User Scene Rev>

<Address>=[0x21-0xFF]—The address of the queried washlight

0x20 offset+address value, MAX possible LRUs=222

| Command Format | <SOT> | <DEST MODE> | <DEST> | <CMD> | <XOR CHECKSUM> | <EOT> |
|---|---|---|---|---|---|---|
| Bytes | 1 | 1 | 1 | 1 | 2 | 1 |
| Data | 0x01 | 0x30-0x32 | 0x20-0xFF | CMD | ASCII XOR XSUM | 0x04 |

CMD Set Description

<SOT>=0x01—Start of Transmission Character

<EOT>=0x04—End of Transmission Character

<DEST MODE>=[0x32]—The destination mode selection byte

0x32=Address Message

<DEST>=The Destination Address.

<DEST>=[0x21-0xFF] 0x20 offset+address, MAX possible LRUs=222

<CMD>=0x52

Protocol—Scene Query Reply

Specifications

Source Device: Addressed Lighting LRU

Destination Device: ACP

1) The ACP should receive a Scene Query Reply message within 50 ms of sending the Scene Query Request message.
2) If a lighting LRU does not respond to the Scene Query Request, the ACP should alert the operator to the problem.

<B Scene Rev>=20 ASCII bytes denoting LRU aircraft Scenes P/N and Rev Number (Stored in LRU non-volatile memory)<

<User Scene Rev>=20 ASCII bytes denoting LRU User Scenes P/N and Rev Number (Stored in LRU non-volatile memory)

Scene Configuration Database

The Scene configuration database is the file which stores the information on custom lighting scenes. This database may be generated externally using a Cabin Lighting Designer program. The database comprises, e.g., the 16 scene content messages separated by ASCII carriage return line feeds.

Database File Format:

<SOT><SCENE1><CR><LF><SCENE2><CR>
<LF><SCENE3><CR><L F><SCENE4><CR><LF>
<SCENE5><CR><LF><SCENE6><CR><LF>
<SCENE7><CR><LF><SCENE8><CR><LF>
<SCENE9><CR><LF><SCENE10><CR><LF>
<SCENE11><CR><LF><SCENE12><CR><LF>
<SCENE13><CR><LF><SCENE14><CR><LF>

<SCENE15><CR><LF><SCENE 16><CR><LF>
<XSUM>

| Name | Bytes | Description |
|---|---|---|
| <SOT> | 1 | Start of Transmit: 0x01 |
| <CR> | 1 | ASCII Carriage Return |
| <LF> | 1 | ASCII Line Feed |
| <XSUM> | 2 | XOR checksum. The XSUM is identical to the communication protocol<SCENEX> = |

| Command Format | <SOT> | <DEST MODE> | <DEST> | <CMD> | <DATA> | <XOR CHECKSUM> | <EOT> |
|---|---|---|---|---|---|---|---|
| Bytes | 1 | 1 | 1 | 1 | 16 | 2 | 1 |
| Data | 0x01 | 0x30-0x32 | 0x20-0xFF | CMD | DATA | ASCII XOR XSUM | 0x04 |

CMD Set Description
<SOT>=0x01—Start of Transmission Character
<EOT>=0x04—End of Transmission Character
<DEST MODE>=[0x30]—The destination mode selection byte
0x30=Broadcast Message
<DEST>=[0x30]—The Destination Address.
<DEST MODE>=0x30:
<DEST>=[0x30]—Don't Care
<CMD>=0x51
<DATA>=S1,R1,R2,G1,G2,B1,B2,W1,W2,E1,E2,A1,A2,T1,T2

S1=[0x30-3F]—Scene Selection byte. Denotes LRU stored scene information
0x30 offset+4 bit scene number. 16 scenes max.
Rx—The Red intensity value is 12 bits wide and split into 2 bytes, R1 and R2.
R1=0x40 offset+Most Significant 6 of 12 bits (RED)
R2=0x40 offset+Least Significant 6 of 12 bits (RED)
Gx—The Green intensity value is 12 bits wide and split into 2 bytes, G1 and G2. G1=0x40 offset+Most Significant 6 of 12 bits (GREEN)
G2=0x40 offset+Least Significant 6 of 12 bits (GREEN)
Bx=The Blue intensity value is 12 bits wide and split into 2 bytes, B1 and B2.
B1=0x40 offset+Most Significant 6 of 12 bits (BLUE)
B2=0x40 offset+Least Significant 6 of 12 bits (BLUE)
Wx=The White intensity value (RGB+W Washlights) is 12 bits wide and split into 2 bytes, W1 and W2
W1=0x40 offset+Most Significant 6 of 12 bits (WHITE)
W2=0x40 offset+Least Significant 6 of 12 bits (WHITE)
Ex=The White intensity value (W+A Washlights) is 12 bits wide and split into 2 bytes, E1 and E2
E1=0x40 offset+Most Significant 6 of 12 bits (WHITE)
E2=0x40 offset+Least Significant 6 of 12 bits (WHITE)
Ax=The Amber intensity value is 12 bits wide and split into 2 bytes, A1 and A2
A1=0x40 offset+Most Significant 6 of 12 bits (AMBER)
A2=0x40 offset+Least Significant 6 of 12 bits (AMBER)
Tx—The scene transition time represents the number of seconds the scene is transitioning. It is a 12 bit wide value and split into 2 bytes, T1 and T2.
T1=0x40 offset+Most Significant 6 of 12 bits
T2=0x40 offset+Least Significant 6 of 12 bits Lighting LOPA Configuration Database
The lighting LOPA configuration database helps to configure the exact light layout on the aircraft. It can contain the descriptions for each lighting LRU, station location as well as firmware/hardware and database revision information. The database file format may comprise multiple device types ( ) separated by an ASCII carriage return and line feed. The ACP can check the validity of the database with the XSUM calculation at the end of the file.
Database File Format:
<SOT><DEVICE1><CR><LF><DEVICE2><CR><LF><DEVICE3><CR><LF><DEVICE4><CR><LF>
<DEVICE5><CR><LF><DEVICE6><CR><LF><DEVICE7><CR>
<LF> . . . <DEVICEX><CR><LF>
<XSUM>
<SOT>=0x01
<CR>=ASCII Carriage Return
<LF>=ASCII Line Feed
<XSUM>=2 byte XOR XSUM. The XSUM is identical to the communication protocol
<DEVICEX>=<Device Type><Device Address><Comm Port><STA LOC><Device Description>

| Name | Bytes | Description |
|---|---|---|
| <Device Type> | 1 | The Device Type:<br>[0x41] = 9100 Direct Lights (W + A)<br>[0x42] = 9150 Cross-Bin Wash Lights (W + A)<br>[0x42] = 9150 COS Wash Light (W + A)<br>[0x43] = 9200 Ceiling Wash Lights (RGB + W)<br>[0x43] = 9200 Sidewall Wash Lights (RGB + W)<br>[0x43] = 9200 Cove Wash Light (RGB + W)<br>[0x43] = 9250 Over-Wing Exit Wash Lights (RGB + WW) |
| <Device Address> | 1 | The Device Address: [0x21-0xFF] |
| <Comm Port> | 1 | The Comm port this Device is on:<br>[0x01] = Comm Port 1<br>[0x02] = Comm Port 2<br>[0x03] = Comm Port 3<br>[0x04] = Comm Port 4<br>[0x05] = Comm Port 5 |
| <STA LOC> | 5 | The ASCII String Description of the Station location with leading zeros |
| <Dev Description> | 40 | The ASCII String Description of the LRU with leading spaces |

System Power-Up
Upon system power up, each LRU can wait for 30 seconds to receive a Scene Selection Message. If none is received within that time period, the LRU should automatically transition to 100% White light or some other default setting.

Although the above has been described for use as lighting within an aircraft the invention is not limited and can apply to other applications as well. The term "aircraft" as used herein is to be understood as a proxy for any passenger vehicle or any illuminated area. Similarly, the term LED or light-emitting diode is to be understood as a proxy for any illumination source that can be controllable in a manner similar to that described herein.

The system or systems may be implemented on any general purpose computer or computers and the components may be implemented as dedicated applications or in client-server architectures, including a web-based architecture. Any of the computers may comprise a processor, a memory for storing program data and executing it, a permanent storage such as a disk drive, a communications port for handling communications with external devices, and user interface devices, including a display, keyboard, mouse, etc. When software modules are involved, these software modules may be stored as program instructions executable on the processor on media such as tape, CD-ROM, etc., where this media can be read by the computer, stored in the memory, and executed by the processor.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Furthermore, the present invention could employ any number of conventional techniques for electronics configuration, signal processing and/or control, data processing and the like. The word mechanism is used broadly and is not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context.

Numerous modifications and adaptations will be readily apparent to those skilled in this art without departing from the spirit and scope of the present invention.

TABLE OF REFERENCE CHARACTERS

10 aircraft lighting system
20 regional lighting
30 aircraft lighting system controller
40 attendant control panel (ACP)
60 intelligent lighting module group
70 power supply
80 filter
90 module group controller
110 module (master module)
110' slave module
112 power plug assembly
114 terminating connector
120 LED group
130 LED/illumination source element

What is claimed is:

1. A method of calibrating a lighting fixture comprising a plurality of discrete illumination sources of distinguishably different color coordinates, the method comprising:

measuring and recording a color coordinate ($C_{mr,g,b}$) for each of the plurality of discrete illumination sources separately while each of the illumination sources is operated at a specific drive level;

measuring and recording an operating temperature ($T_0$) along with the recorded color coordinates;

inputting a desired target color set point ($C_T$) and luminous flux ($\phi_T$);

obtaining operating color coordinates ($C_1$) and luminous flux ($\phi_1$) of each LED at the drive level duty cycle ($d_1$) using at least one of an iterative method, a color shift measurement method, and a direct measurement method;

operating the lighting fixture at the obtained operating color coordinates ($C_1$) and luminous flux ($\phi_1$) of each LED at the drive level duty cycle $d_1$, and measuring the overall measured color coordinates ($C_{mT}$) and luminous flux ($\phi_{mT}$) along with the temperature ($T_0$);

determining if the distance between the measured color coordinates ($C_{mT}$) and the operating color coordinates ($C_1$) are less than a predefined value;

if not, then computing a computed flux ($\phi_c$) based on the measured color coordinates ($C_{mT}$) and the measured luminous flux ($\phi_{mT}$), and adjusting the operating luminous flux ($\phi_1$) and returning to the operating of the light fixture at the adjusted operating luminous flux ($\phi_1$);

if so, then measuring the operating temperature $T_0$ and recording the operating temperature with the operating color coordinates ($C_1$) and the adjusted operating luminous flux ($\phi_1$);

estimating an operating luminous flux ($\phi_n$) for color points with a same color coordinate ($C_n$) but different flux level; and performing a validation that ensures the lighting fixture produces desired color set points when the fixture is controlled using compensation methods that use calibration data derived from the above procedure.

2. The method of claim 1, wherein the obtaining is performed using an iterative method, comprising:

initially setting a color point to a recorded color point;
performing a color mixing to determine a desired luminous flux of each of the illumination sources corresponding to the color set point;
determining a duty cycle of each of the illumination sources according to a duty cycle computation;
determining a new color coordinate by applying the determined duty cycle;
determining if a difference between the initial color point and the new color point is less than a small threshold value;
  if the difference is not less than the threshold value, in a new iteration of the above, setting the initial color point to the new color point and repeating the above steps beginning with the performing; and
  if the difference is less than or equal to the threshold value, then setting the operating color coordinate to the new color coordinate and operating luminous flux to the desired luminous flux.

3. The method of claim 1, wherein the obtaining is performed using a color shift measurement method, comprising:
initially setting a color point to a recorded color point;
performing a color mixing to determine a desired luminous flux of each of the illumination sources corresponding to the color set point;
determining a duty cycle of each illumination source according to a duty cycle computation;
measuring color coordinates of the illumination sources, and determining a new color point; and
setting the operating color coordinate to the new color coordinate and operating luminous flux to the desired luminous flux.

4. The method of claim 1, wherein the obtaining is performed using a direct measurement method, comprising:
if the measuring of the color coordinate at one flux level has not taken place:
  initially setting a color point to a recorded color point;
  performing a color mixing to determine a desired luminous flux of each of the illumination sources corresponding to the color set point;
  determining a duty cycle of each illumination source according to a duty cycle computation;
  measuring color coordinates of the illumination sources, and determining a new color point; and
if the measuring of the color coordinate at one flux level has taken place:
  setting the operating color coordinate to the measured color coordinate and operating luminous flux to the measured luminous flux.

5. The method of claim 1, wherein producing the desired target color set point and luminous flux comprises operating the illumination source for a period of time corresponding to a typical operating condition thereby ensuring an accurate reading corresponding to typical operating conditions in the field.

6. The method of claim 1, wherein the predefined value is one MacAdam Ellipse.

\* \* \* \* \*